US012429791B2

(12) United States Patent
Ooyama et al.

(10) Patent No.: US 12,429,791 B2
(45) Date of Patent: Sep. 30, 2025

(54) TONER

(71) Applicant: CANON KABUSHIKI KAISHA, Tokyo (JP)

(72) Inventors: Kazunari Ooyama, Ibaraki (JP); Yuu Nishimura, Chiba (JP); Nobuyoshi Sugahara, Tokyo (JP); Hitoshi Sano, Chiba (JP); Toru Takahashi, Ibaraki (JP); Kazuki Murata, Tokyo (JP); Daisuke Tsujimoto, Tokyo (JP); Koh Ishigami, Chiba (JP); Shin Kitamura, Ibaraki (JP); Takaho Shibata, Tokyo (JP); Ryo Nakajima, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/617,257

(22) Filed: Mar. 26, 2024

(65) Prior Publication Data

US 2024/0280920 A1 Aug. 22, 2024

Related U.S. Application Data

(63) Continuation of application No. 17/383,033, filed on Jul. 22, 2021, now abandoned.

(30) Foreign Application Priority Data

Aug. 14, 2020 (JP) ................................ 2020-137049

(51) Int. Cl.
*G03G 9/097* (2006.01)
*G03G 9/087* (2006.01)

(52) U.S. Cl.
CPC ..... *G03G 9/09708* (2013.01); *G03G 9/08755* (2013.01); *G03G 9/09725* (2013.01)

(58) Field of Classification Search
None
See application file for complete search history.

(56) References Cited

U.S. PATENT DOCUMENTS 6,326,114 B1 12/2001 Itakura et al.
6,528,222 B2 3/2003 Kohtaki et al.
(Continued)

FOREIGN PATENT DOCUMENTS

CN 103229109 A 7/2013
CN 110865521 A 3/2020
(Continued)

OTHER PUBLICATIONS

Translation of WO-2015098921-A1.*
(Continued)

*Primary Examiner* — Peter L Vajda
(74) *Attorney, Agent, or Firm* — VENABLE LLP

(57) ABSTRACT

A toner includes toner particles containing a binder resin, a colorant, and inorganic fine particles, in which in a depth profile of an element distribution in a depth region from the outermost surface of a particle to a depth of 500 nm the depth profile being obtained by an element analysis performed by X-ray photoelectron spectroscopy using the toner as a sample, two or more minimum points of a concentration of a carbon element in the depth region exist, a concentration of an inorganic element becomes a maximum value at a depth position corresponding to each of the minimum points, and the inorganic element is an element derived from the inorganic fine particle.

3 Claims, 5 Drawing Sheets

(56) References Cited

U.S. PATENT DOCUMENTS

| | | | |
|---|---|---|---|
| 6,586,147 | B2 | 7/2003 | Iida et al. |
| 6,751,424 | B2 | 6/2004 | Komatsu et al. |
| 6,929,894 | B2 | 8/2005 | Sugahara et al. |
| 7,022,449 | B2 | 4/2006 | Sugahara et al. |
| 7,138,213 | B2 | 11/2006 | Itakura et al. |
| 7,144,668 | B2 | 12/2006 | Baba et al. |
| 7,147,980 | B2 | 12/2006 | Itakura et al. |
| 7,279,262 | B2 | 10/2007 | Fujikawa et al. |
| 7,288,348 | B2 | 10/2007 | Hayami et al. |
| 7,297,455 | B2 | 11/2007 | Fujikawa et al. |
| 7,300,733 | B2 | 11/2007 | Sugahara et al. |
| 7,320,850 | B2 | 1/2008 | Itakura et al. |
| 7,396,626 | B2 | 7/2008 | Fujikawa et al. |
| 7,396,629 | B2 | 7/2008 | Baba et al. |
| 7,442,478 | B2 | 10/2008 | Itakura et al. |
| 7,611,813 | B2 | 11/2009 | Ida et al. |
| 7,629,100 | B2 | 12/2009 | Okamoto et al. |
| 7,767,370 | B2 | 8/2010 | Ishigami et al. |
| 7,833,687 | B2 | 11/2010 | Kato et al. |
| 7,858,283 | B2 | 12/2010 | Ishigami et al. |
| 7,906,262 | B2 | 3/2011 | Ishigami et al. |
| 7,927,775 | B2 | 4/2011 | Komatsu et al. |
| 7,939,233 | B2 | 5/2011 | Inoue et al. |
| 8,114,562 | B2 | 2/2012 | Ishigami et al. |
| 8,137,886 | B2 | 3/2012 | Baba et al. |
| 8,298,742 | B2 | 10/2012 | Okamoto et al. |
| 8,323,726 | B2 | 12/2012 | Naka et al. |
| 8,501,377 | B2 | 8/2013 | Takahashi et al. |
| 8,512,925 | B2 | 8/2013 | Moribe et al. |
| 8,697,327 | B2 | 4/2014 | Shibata |
| 8,921,023 | B2 | 12/2014 | Baba et al. |
| 8,927,188 | B2 | 1/2015 | Naka et al. |
| 8,945,805 | B2 | 2/2015 | Baba et al. |
| 8,974,994 | B2 | 3/2015 | Kamae et al. |
| 8,986,914 | B2 | 3/2015 | Fujikawa et al. |
| 9,034,551 | B2 | 5/2015 | Endo et al. |
| 9,057,970 | B2 | 6/2015 | Ida et al. |
| 9,058,924 | B2 | 6/2015 | Komatsu et al. |
| 9,063,443 | B2 | 6/2015 | Ishigami et al. |
| 9,097,998 | B2 | 8/2015 | Yamazaki et al. |
| 9,128,400 | B2 | 9/2015 | Takahashi et al. |
| 9,158,217 | B2 | 10/2015 | Takahashi et al. |
| 9,348,247 | B2 | 5/2016 | Ida et al. |
| 9,454,094 | B2 | 9/2016 | Tsujimoto et al. |
| 9,500,975 | B2 | 11/2016 | Sugahara et al. |
| 9,540,483 | B2 | 1/2017 | Ida et al. |
| 9,599,920 | B2 | 3/2017 | Sugahara et al. |
| 9,606,466 | B2 | 3/2017 | Takahashi et al. |
| 9,665,023 | B2 | 5/2017 | Kamae et al. |
| 9,696,644 | B2 | 7/2017 | Ida et al. |
| 9,703,216 | B2 | 7/2017 | Tsuchida et al. |
| 9,778,598 | B2 | 10/2017 | Onozaki et al. |
| 9,785,070 | B2 | 10/2017 | Sugahara et al. |
| 9,897,934 | B2 | 2/2018 | Tamura et al. |
| 9,915,885 | B2 | 3/2018 | Katsumata et al. |
| 9,958,809 | B2 | 5/2018 | Sugahara et al. |
| 9,969,834 | B2 | 5/2018 | Ohtsu et al. |
| 10,007,206 | B2 | 6/2018 | Sugahara et al. |
| 10,012,918 | B2 | 7/2018 | Ishigami et al. |
| 10,012,920 | B2 | 7/2018 | Shibata et al. |
| 10,012,921 | B2 | 7/2018 | Kamae et al. |
| 10,036,970 | B2 | 7/2018 | Kanno et al. |
| 10,078,281 | B2 | 9/2018 | Ida et al. |
| 10,088,765 | B2 | 10/2018 | Miyakai et al. |
| 10,133,201 | B2 | 11/2018 | Kamae et al. |
| 10,146,146 | B2 | 12/2018 | Komatsu et al. |
| 10,175,595 | B2 | 1/2019 | Onozaki et al. |
| 10,197,936 | B2 | 2/2019 | Onozaki et al. |
| 10,203,619 | B2 | 2/2019 | Yamashita et al. |
| 10,216,108 | B2 | 2/2019 | Iwasaki et al. |
| 10,228,629 | B2 | 3/2019 | Tamura et al. |
| 10,234,777 | B2 | 3/2019 | Ohtsu et al. |
| 10,401,748 | B2 | 9/2019 | Hashimoto et al. |
| 10,409,188 | B2 | 9/2019 | Sugahara et al. |
| 10,423,090 | B2 | 9/2019 | Ohtsu et al. |
| 10,451,985 | B2 | 10/2019 | Takahashi et al. |
| 10,451,986 | B2 | 10/2019 | Sano et al. |
| 10,474,049 | B2 | 11/2019 | Onozaki et al. |
| 10,551,759 | B2 | 2/2020 | Watanabe et al. |
| 10,642,178 | B2 | 5/2020 | Yamashita et al. |
| 10,747,132 | B2 | 8/2020 | Takahashi et al. |
| 10,768,543 | B2 | 9/2020 | Tsujimoto et al. |
| 10,775,710 | B1 | 9/2020 | Kamae et al. |
| 10,838,317 | B2 | 11/2020 | Sugahara et al. |
| 10,859,935 | B2 | 12/2020 | Ohtsu et al. |
| 10,859,936 | B2 | 12/2020 | Sugahara et al. |
| 10,877,386 | B2 | 12/2020 | Murayama et al. |
| 10,877,391 | B2 | 12/2020 | Matsuo et al. |
| 10,935,902 | B2 | 3/2021 | Kanno et al. |
| 10,955,765 | B2 | 3/2021 | Onozaki et al. |
| 11,131,938 | B2 | 9/2021 | Murayama et al. |
| 11,720,036 | B2 | 8/2023 | Kobori et al. |
| 2009/0239171 | A1 | 9/2009 | Anno et al. |
| 2010/0028796 | A1 | 2/2010 | Nakamura et al. |
| 2010/0183971 | A1 | 7/2010 | Fujikawa et al. |
| 2011/0294064 | A1 | 12/2011 | Miyaake et al. |
| 2013/0108955 | A1 | 5/2013 | Shibata et al. |
| 2013/0244159 | A1 | 9/2013 | Ishigami et al. |
| 2013/0244164 | A1 | 9/2013 | Fujikawa et al. |
| 2013/0252167 | A1 | 9/2013 | Moribe et al. |
| 2013/0309603 | A1 | 11/2013 | Takahashi et al. |
| 2014/0134535 | A1 | 5/2014 | Baba et al. |
| 2015/0099227 | A1 | 4/2015 | Ida et al. |
| 2018/0275540 | A1 | 9/2018 | Matsuo et al. |
| 2018/0314176 | A1 | 11/2018 | Ikeda et al. |
| 2020/0073266 | A1 | 3/2020 | Ohtsu et al. |
| 2020/0192233 | A1 | 6/2020 | Takahashi et al. |
| 2021/0055668 | A1 | 2/2021 | Tamura et al. |
| 2021/0063903 | A1 | 3/2021 | Shibata et al. |
| 2021/0223710 | A1 | 7/2021 | Takahashi et al. |
| 2021/0286282 | A1 | 9/2021 | Kobori et al. |
| 2021/0302853 | A1 | 9/2021 | Murata et al. |
| 2021/0302854 | A1 | 9/2021 | Kitamura et al. |
| 2021/0389688 | A1 | 12/2021 | Shibata et al. |

FOREIGN PATENT DOCUMENTS

| | | | | | |
|---|---|---|---|---|---|
| JP | 2001-147547 | A | | 5/2001 | |
| JP | 2008-3481 | A | | 1/2008 | |
| JP | 2009-258681 | | * | 11/2009 | ............... G03G 9/08 |
| JP | 2009-258681 | A | | 11/2009 | |
| JP | 2010-176063 | A | | 8/2010 | |
| JP | 2012-8530 | A | | 1/2012 | |
| JP | 2014-178528 | A | | 9/2014 | |
| JP | 2015-176038 | A | | 10/2015 | |
| JP | 2019-191451 | A | | 10/2019 | |
| WO | WO-2015098921 | A1 | * | 7/2015 | ........... G03G 9/0821 |

OTHER PUBLICATIONS

Translation of JP 2009-258681.*

Preparation and application technology of ultrafine powder, Apr. 30, 2001, 201-202.

* cited by examiner

TONER

BACKGROUND OF THE INVENTION

Field of the Invention

The present invention relates to a toner for developing an electrostatic image used in an electrophotographic method, an electrostatic recording method, or the like.

Description of the Related Art

In order to cope with recent high image quality, energy saving, and high-speed printing, it is required to use a toner having a small particle size, low-temperature fixability, and sharp meltability. For example, for energy saving, power consumption in a fixing process is suppressed using a binder resin having a low glass transition point or softening point for the toner. Furthermore, in order to cope with high-speed printing, the toner is quickly melted using a binder resin having sharp meltability for the toner. In addition, in order to cope with high image quality, the toner has a small particle size to suppress a noise on an image and improve micro-image quality.

However, when such a technique is used, toner particles may aggregate with each other to form aggregates of the toner particles, resulting in deterioration of transferability. That is, in a transfer step in an image forming process, since the toner particles easily aggregate with each other, an adhesive force to an electrostatic latent image-bearing member is increased. As a result, the transfer efficiency of the toner on the electrostatic latent image-bearing member onto an intermediate transfer body may be reduced.

In order to suppress such aggregation of the toner particles, a technique for adding an external additive such as silica particles to a surface of the toner particle is used, but as the toner particle has a smaller particle size, a larger amount of the external additive is required in order to suppress aggregation of the toner particles. However, in a case where a larger amount of the external additive is added, adhesion of the external additive to the toner particles tends to be low, and the external additive is easily transferred to a carrier or a drum by application of an external force such as collision with the carrier in long-term use in an image forming apparatus. Therefore, a coating rate of the external additive on the surface of the toner particle is reduced, and the surface of the toner particle is exposed. As a result, the toner particles easily aggregate with each other, and the transfer efficiency of the toner may thus be reduced. In addition, there is a problem in that the image quality may deteriorate as the transfer efficiency of the toner is reduced due to long-term use.

In order to suppress the transfer of the external additive to the carrier or the drum, a method in which an external additive having a small particle size and a large particle size is charged into a Henschel mixer together with toner particles to be mixed with the toner particles is proposed (see Japanese Patent Application Laid-Open No. 2001-147547).

SUMMARY OF THE INVENTION

However, in the method of Japanese Patent Application Laid-Open No. 2001-147547, although the adhesion of the external additive to the surface of the toner particle can be improved as compared with the case of adding the external additive having a single particle size, in a case where a larger amount of the external additive is required to enhance the transferability of the toner such as using toner particles having a small particle size, the transfer of the external additive to the carrier or the drum may not be sufficiently suppressed. In particular, there is room for improvement in terms of suppressing the transfer of the external additive and maintaining the coating rate of the toner particles with the external additive not only in an initial stage but also in long-term use.

The present invention has been made to solve the above-described problems, and an object of the present invention to provide a toner capable of suppressing deterioration of transferability in long-term use and suppressing occurrence of ghost.

The present inventors found that deterioration of transferability in long-term use can be suppressed and occurrence of ghost can be suppressed by using a toner including toner particles containing a binder resin, a colorant and inorganic fine particles, in which in a depth profile of an element distribution in a depth region from the outermost surface of a particle to a depth of 500 nm when an element analysis is performed using the toner as a sample by X-ray photoelectron spectroscopy, two or more minimum points of a concentration of a carbon element contained in the depth region exist, a concentration of an inorganic element becomes a maximum value at a depth position corresponding to each of the minimum points, and the inorganic element is an element derived from the inorganic fine particle.

That is, the toner of the present invention is a toner including a toner particle, the toner particle containing a binder resin, a colorant and an inorganic fine particle, in which in a depth profile of an element distribution in a depth region from the outermost surface of a particle to a depth of 500 nm, the depth profile being obtained by an element analysis performed by X-ray photoelectron spectroscopy using the toner as a sample, two or more minimum points of a concentration of a carbon element in the depth region exist, a concentration of an inorganic element becomes a maximum value at a depth position corresponding to each of the minimum points, and the inorganic element is an element derived from the inorganic fine particle.

According to the present invention, it is possible to provide a toner capable of suppressing deterioration of transferability in long-term use and suppressing occurrence of ghost.

Further features of the present invention will become apparent from the following description of exemplary embodiments with reference to the attached drawings.

DESCRIPTION OF THE EMBODIMENTS

Figure 1:
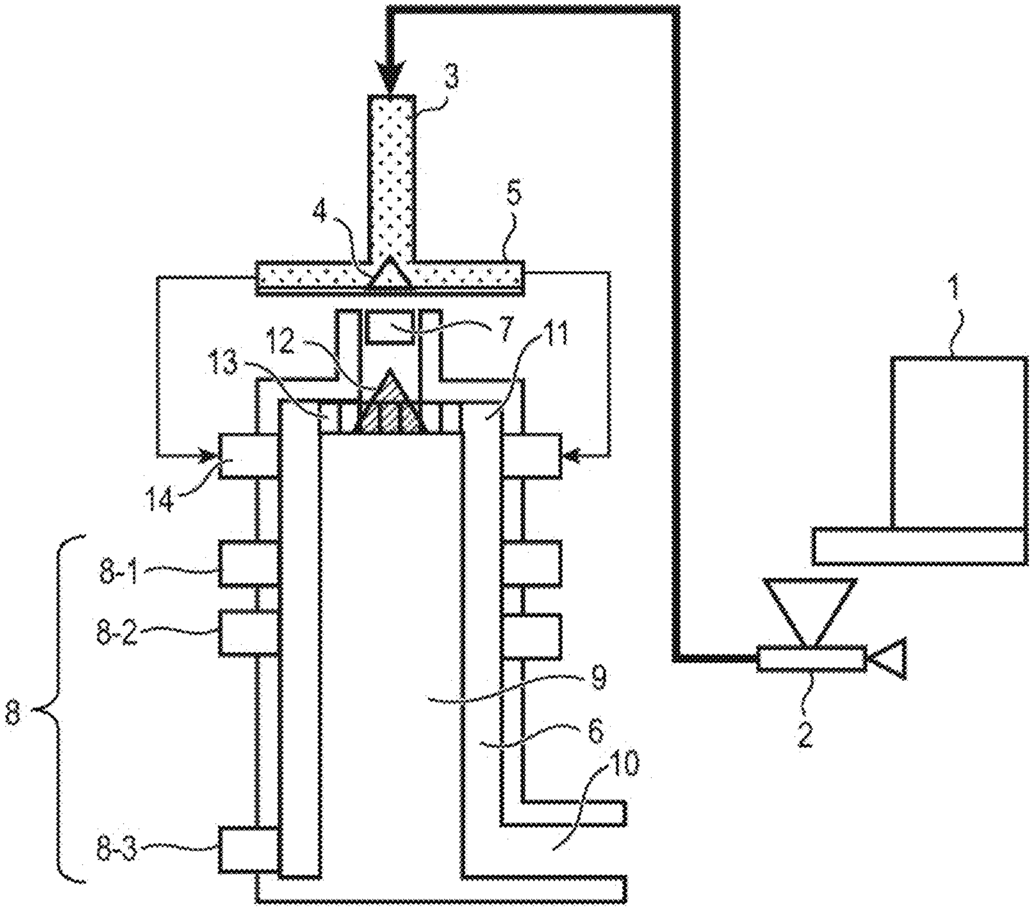
FIG. 1 is a schematic explanatory view of a surface heat treatment apparatus for toner particles.

Preferred embodiments of the present invention will now be described in detail in accordance with the accompanying drawings.

In the present invention, the description "oo or more and xx or less" or "00 to xx" representing a numerical range refers to a numerical range including a lower limit and an upper limit which are endpoints, unless otherwise stated.

A toner of the present invention is a toner including: toner particles containing a binder resin and a colorant; and one or more kinds of inorganic fine particles present on a surface of the toner particle, in which in a depth profile of an element distribution in a depth region from the outermost surface of a particle to a depth of 500 nm when an element analysis is performed using the toner as a sample by X-ray photoelectron spectroscopy, two or more minimum points of a concentration of a carbon element in the depth region exist, a concentration of an inorganic element becomes a maximum value at a depth position corresponding to each of the minimum points, and the inorganic element is an element derived from the inorganic fine particle.

The expression of "at a depth position corresponding to each of the minimum points" not only means that the depth position exactly corresponds to each of the minimum points, but also includes the cases that the depth position is present at any one of positions generally understood as corresponding to each of the minimum points.

In the present specification, the surface of the toner particle is a region of about 500 nm to about 1,000 nm from the outermost surface that is a depth region in which an external additive can be disposed, and the outermost surface of the toner particle is a region of a degree of decomposition in a depth direction in the X-ray photoelectron spectroscopy, is a layer of several atoms from the outermost surface, and is a region of about 1 nm to 2 nm.

An inorganic fine particle used as an external additive such as a silica particle has a relatively higher hardness than a material constituting the toner particles such as a binder resin. Since the inorganic fine particles having a high hardness are distributed so that a distribution in a depth direction of a concentration in the toner has two or more peaks in the depth region from the outermost surface of the toner particle to the depth of 500 nm, the toner particle can have toughness against application of an external force.

Although the reason is not clear, it is considered as follows.

That is, in a case where a large amount and high density of a material having a high hardness such as an external additive is present only on the outermost surface of the toner particle, the hardness of only the outermost surface is high in the hardness distribution of the toner particles, such that the external additive constituting the outermost surface is likely to be removed by application of an external force due to collision with a carrier or the like. The surface of the toner particle is exposed by the removal of the external force, and as a result, the toner particles easily aggregate with each other, and the transferability of the toner deteriorates.

On the other hand, as described above, a plurality of positions where a concentration of a material having a somewhat high hardness is high in the depth direction of the toner are distributed, such that the toner particle has toughness against application of an external force and is less likely to be broken. Therefore, when an external force is applied due to collision with a carrier or the like, which occurs during long-term use, even in a case of a toner having a large amount of the external additive on the outermost surface, a structure of the surface thereof is less likely to be broken. Therefore, transfer of the external additive to a carrier or a drum is suppressed, and the high coating rate of the surface of the toner particle with the external additive is maintained, such that the high transfer efficiency of the toner can be maintained for a long time.

Specifically, the internal structure of such a toner particle exhibits the following distribution in a depth direction of a composition in the toner particle measured by X-ray photoelectron spectroscopy. That is, the distribution shows that two or more minimum points of a concentration of a carbon element in a depth region from the outermost surface of the toner particle to 500 nm exist, and a concentration of an inorganic element derived from an external additive in a depth position corresponding to each of the minimum points has a maximum point.

Examples of a method for realizing such a distribution can include a method of performing a step of subjecting toner particles to external addition of an external additive (hereinafter, referred to as an "external addition step") and then performing a heat spheroidizing treatment step a plurality of times, and a method of performing only an external addition step a plurality of times.

In these methods, the external additive can be disposed at a desired depth position from the outermost surface of the toner particle by controlling a hot air temperature or feed in the heat spheroidizing treatment step, and an external addition time in the external addition step or a temperature and a shape of a blade or the number of blades in the external addition step.

As for the shape of the blade, the external additive can be disposed at a deeper position from the outermost surface of the toner particle as a surface of the blade in a rotation direction is perpendicular to a rotation surface. In addition, the external additive can be disposed at a deeper position from the outermost surface of the toner particle as the number of blades increases.

Furthermore, the inorganic fine particles of the toner of the present invention preferably contain silica fine particles. When the inorganic fine particles contain silica fine particles, appropriate negative chargeability is imparted to the toner, such that excellent developability and transferability can be obtained.

In addition, the inorganic fine particle of the toner of the present invention preferably contains strontium titanate fine particles. When the strontium titanate fine particles are contained, aggregation of the toner particles is suppressed, such that transfer efficiency of the toner can be enhanced.

In addition, in the toner of the present invention, when a concentration of all elements measured by X-ray photoelectron spectroscopy is 100%, the concentration at the minimum point related to the concentration of the carbon element of the toner particle is preferably 90% or less. When the concentration of the carbon element is 90% or less, the toughness of the toner particle against application of an external force is increased, and the external additive exposed on the outermost surface of the toner particle is increased, such that the toner can have a high coating rate of the external additive. By using the toner particles having such physical properties, high transfer efficiency can be further maintained in long-term use from the initial stage.

In addition, the toner particle of the present invention preferably contains a crystalline polyester. When the toner particle contains a crystalline polyester, a toner having both high transfer efficiency and excellent low-temperature fixability in long-term use from the initial stage can be obtained.

Hereinafter, a preferred aspect of the present invention will be described.

<Silica Particle>

The silica particle used in the present invention is a particle containing silica (that is, $SiO_2$) as a main component, and examples of a method of producing the silica particles can include the following methods: a flame melting method of gasifying a silicon compound and decomposing and melting the gasified silicon compound in flame; a gas phase method of burning silicon tetrachloride at a high temperature together with a mixed gas of oxygen, hydrogen, and a dilution gas (for example, nitrogen, argon, carbon dioxide, or the like) (silica or fumed silica by a dry method); a gas phase oxidation method of obtaining a silica fine powder by directly oxidizing a metal silicon powder with a chemical flame composed of oxygen-hydrogen; a wet method of hydrolyzing alkoxysilane in an organic catalyst in which water is present using a catalyst to cause a condensation reaction, removing a solvent from the obtained silica sol suspension, and performing drying (sol-gel silica); a sedimentation method of producing and precipitating silica by bringing a water glass aqueous solution into contact with a mineral acid to cause sedimentation of the silica; and a method of obtaining quartz by pulverization.

In addition, the silica fine particles obtained by the production method as described above may be subjected to a classification treatment and/or a pulverization treatment. A number average particle size of the silica fine particles is preferably 5 nm or more and 250 nm or less. Among the silica fine particles, silica fine particles produced by a gas phase method or a flame melting method are more preferred because the silica fine particle has a higher resistance and is hardly affected by humidity. In a case where the silica fine particles produced by a gas phase method or a flame melting method are used, a number average particle size of primary particles of the silica fine particles can be controlled by a raw material gas feed rate, a feed amount of a combustible gas and/or an oxygen ratio, or the like. In the present invention, the silica fine particles produced by a gas phase method are also preferred, and since it is possible to instantaneously make the inside of a reaction system equal to or higher than a melting point of silica, it is a preferred production method for controlling a particle size of the silica fine particle.

A surface of the silica fine particle of the toner of the present invention is preferably hydrophobized by a surface treatment. By hydrophobizing the surface, moisture adsorption of the silica fine particles is suppressed, chargeability of the toner is enhanced, charging is easily performed even during long-term use, and a stable image density is easily obtained.

Examples of the surface treatment can include a silane coupling treatment, an oil treatment, a fluorine treatment, and a surface treatment for forming an alumina film. It is also possible to use a plurality of types of surface treatments in combination, and the order of these treatments can also be arbitrarily selected.

The silica fine particles of the toner of the present invention are preferably subjected to a surface treatment using dimethyldichlorosilane or hexamethyldisilazane as a surface treatment agent.

Examples of a method of the surface treatment of the silica fine particles with a silane coupling agent can include the following methods:

a dry method of stirring silica fine particles to form a cloud shape and reacting a vaporized silane coupling agent with the cloud-shaped silica fine particles; and a dry method of dispersing silica fine particles in a solvent and adding dropwise a silane coupling agent to react with the silica fine particles.

Examples of oil for an oil treatment of the silica fine particles can include silicone oil, fluorine oil, and various types of modified oil. More preferably, examples of the oil can include dimethyl silicone oil, alkyl-modified silicone oil, α-methylstyrene-modified silicone oil, chlorophenyl silicone oil, and fluorine-modified silicone oil. The number average particle size of the silica fine particles after the surface treatment obtained by these surface treatments is preferably 5 nm or more and 300 nm or less.

<Strontium Titanate Particle>

The strontium titanate particles preferably used in the present invention can be produced by, for example, a normal pressure heat reaction method. In this case, a mineral acid-deflocculated product of a hydrolyzate of a titanium compound is preferably used as a titanium oxide source, and a water-soluble acidic strontium compound is preferably used as a strontium oxide source. Then, strontium titanate particles can be produced by a method in which an aqueous alkaline solution is added to and reacted with a mixed solution of these raw materials at 60° C. or higher, and then an acid treatment is performed.

Hereinafter, a method of producing strontium titanate particles using a normal pressure heat reaction will be described. A mineral acid-deflocculated product of a hydrolyzate of a titanium compound is used as a titanium oxide source. Metatitanic acid having a content of $SO_3$ obtained by a sulfuric acid method of preferably 1.0% by mass or less, and more preferably of 0.5% by mass or less is deflocculated by adjusting a pH to 0.8 or more and 1.5 or less with hydrochloric acid.

On the other hand, as the strontium oxide source, for example, strontium nitrate or strontium chloride can be used. The strontium titanate particles obtained here are preferred due to its perovskite crystal structure from the viewpoint of further improving the environmental stability of charging. In addition, caustic alkali can be used as the aqueous alkaline solution, and in particular, an aqueous sodium hydroxide solution is preferred.

In the production method, examples of factors that affect the particle size of the obtained the strontium titanate particle can include a pH when deflocculating metatitanic acid with hydrochloric acid, a mixing proportion of the titanium oxide source and the metal source other than titanium, and a concentration of the titanium oxide source in the initial stage of the reaction. Furthermore, examples of the factors can include a temperature, an addition rate, a reaction time, and stirring conditions when an aqueous alkaline solution is added. In particular, after addition of the aqueous alkaline solution, when the reaction is stopped by rapidly lowering the temperature of the system through charging into ice water or the like, the reaction can be forcibly stopped while crystal growth is saturated, and a wide particle size distribution is easily obtained. In addition, it is possible to obtain a wide particle size distribution by making the reaction system heterogeneous by lowering a stirring speed, altering a stirring method, or the like. These factors can be appropriately adjusted in order to obtain strontium titanate particles having a target particle size and particle size distribution. It is preferable to prevent carbon dioxide gas from being mixed, for example, by performing a reaction under a nitrogen gas atmosphere in order to prevent generation of carbonate in a reaction process.

A mixing ratio ($SrO/TiO_2$) of the strontium oxide source to the titanium oxide source during the reaction is preferably 1.00 or more and 1.40 or less and more preferably 1.05 or more and 1.20 or less in terms of molar ratio.

When $SrO/TiO_2$ is less than 1.00, not only metal titanate but also unreacted titanium oxide is likely to remain in a reaction product. A metal source other than titanium has relatively high solubility in water, whereas the titanium oxide source has low solubility in water. Therefore, when $SrO/TiO_2$ is 1.00 or less, not only metal titanate but also unreacted titanium oxide tends to easily remain in the reaction product. A concentration of the titanium oxide source in the initial stage of the reaction is preferably 0.050 mol/L or more and 1.300 mol/L or less and more preferably 0.080 mol/L or more and 1.200 mol/L or less in terms of $TiO_2$. By increasing the concentration of the titanium oxide source at the initial stage of the reaction, the number average particle size of primary particles of the strontium titanate particles can be reduced.

When a temperature when the aqueous alkaline solution is added is 100° C. or higher, a pressure vessel such as an autoclave is required, and practically, the temperature is appropriately in a range of 60° C. or higher and lower than 100° C. In addition, strontium titanate particles having a larger particle size are obtained as the addition rate of the aqueous alkaline solution is lower, and strontium titanate particles having a smaller particle size are obtained as the addition rate of the aqueous alkaline solution is higher. The addition rate of the aqueous alkaline solution is preferably 0.001 equivalent/h or more and 1.2 equivalent/h or less, and more preferably 0.002 equivalent/h or more and 1.1 equivalent/h or less, with respect to the charged raw materials. The addition rate of the aqueous alkaline solution can be appropriately adjusted according to a particle size to be obtained.

In the production method, the strontium titanate particles obtained by the normal pressure heat reaction is more preferably subjected to an acid treatment. In a case where the strontium titanate particles are produced by performing the normal pressure heat reaction, when the mixing ratio ($SrO/TiO_2$) of the strontium oxide source to the titanium oxide source is 1.00 or more in terms of molar ratio, the following easily occurs. That is, a metal source other than unreacted titanium remaining after completion of the reaction reacts with carbon dioxide gas in the air to easily generate impurities such as metal carbonate. In addition, in a case where impurities such as metal carbonate remain on the surface, when the surface treatment for imparting hydrophobicity is performed, it is difficult to perform uniform coating with the surface treatment agent due to the influence of the impurities. Therefore, after the addition of the aqueous alkaline solution, an acid treatment may be performed to remove an unreacted metal source. In the acid treatment, a pH is preferably adjusted to 2.5 or more and 7.0 or less, and the pH is more preferably adjusted to 4.5 or more and 6.0 or less, using hydrochloric acid. As the acid, nitric acid, acetic acid, or the like can be used for the acid treatment in addition to hydrochloric acid. When sulfuric acid is used, metal sulfate having low solubility in water is likely to be generated.

Strontium titanate of the present invention is not particularly limited as long as it can be subjected to the surface treatment and can be produced in a cubic shape or a rectangular parallelepiped shape. In addition, as a method for controlling the shape of the strontium titanate particle, a dry mechanical treatment method may be used. The surface treatment agent is not particularly limited, and examples thereof can include a disilylamine compound, a halogenated silane compound, a silicone compound, and a silane coupling agent.

An example of the disilylamine compound can include a compound having a disilylamine (Si—N—Si) moiety. Examples of the disilylamine compound can include hexamethyldisilazane (HMDS), N-methyl-hexamethyldisilazane, and hexamethyl-N-propyldisilazane. An example of the halogenated silane compound can include dimethyldichlorosilane.

Examples of the silicone compound can include silicone oil and a silicone resin (varnish). Examples of the silicone oil can include dimethyl silicone oil, methylphenyl silicone oil, α-methylstyrene-modified silicone oil, chlorophenyl silicone oil, and fluorine-modified silicone oil. Examples of the silicone resin (varnish) can include methyl silicone varnish and phenyl methyl silicone varnish.

Examples of the silane coupling agent can include a silane coupling agent having an alkyl group and an alkoxy group, a silane coupling agent having an amino group and an alkoxy group, and a fluorine-containing silane coupling agent. More specific examples of the silane coupling agent can include dimethyldimethoxysilane, dimethyldiethoxysilane, diethyldimethoxysilane, diethyldiethoxysilane, trimethylmethoxysilane, trimethyldiethoxysilane, triethylmethoxysilane, triethyldiethoxysilane, γ-glycidoxypropyltrimethoxysilane, γ-chloropropyltrimethoxysilane, γ-aminopropyltrimethoxysilane, γ-aminopropyltriethoxysilane, γ-aminopropyldimethoxylsilane, or γ-aminopropyldiethoxymethylsilane, 3,3,3-trifluoropropyldimethoxysilane, 3,3,3-trifluoropropyldiethoxysilane, perfluorooctylethyltriethoxysilane, and 1,1,1-trifluorohexyldiethoxysilane. In particular, it is preferable that the strontium titanate particles are treated with a fluorine-based silane coupling agent such as trifluoropropyltrimethoxysilane or perfluorooctylethyltriethoxysilane.

In addition, as a preferred amount of the treatment agent, the treatment is preferably performed in an amount of 0.5 to 20.0 parts by mass with respect to 100 parts by mass of the strontium titanate particles. These surface treatment agents may be used alone or in combination of two or more thereof. A number average particle size of the strontium titanate particles is preferably 20 nm or more and 200 nm or less. In addition, in a case where two kinds of silica fine particles and strontium titanate fine particles are used, a preferred use ratio thereof is as follows. That is, in a silica external additive coating rate $\sigma SiO_2(\%)$ after a water washing treatment described below and a strontium titanate external additive coating rate $\sigma SrTiO_3(\%)$ after the water washing treatment, the use ratio is preferably set so that $\sigma SrTiO_3(\%)/(\sigma SiO_2(\%)+\sigma SrTiO_3(\%))$ is 80(%) or less. As the inorganic fine particles that can be used in addition to the silica particles and the strontium titanate particles, fine particles such as alumina, titanium oxide, aluminum oxide, barium titanate, magnesium titanate, calcium titanate, zinc oxide, tin oxide, silica sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride can be used. In addition, these fine particles including two or more kinds thereof may be used.

<Binder Resin>

It is required for the toner particle in the present invention to contain a polyester resin as a binder resin from the viewpoint of low-temperature fixability. In addition, the binder resin may be a hybrid resin in which a polyester resin and a vinyl-based resin are mixed or both are partially reacted. A polyhydric alcohol (dihydric or trihydric or higher alcohol), a polyvalent carboxylic acid (divalent or trivalent or more carboxylic acid), an acid anhydride thereof, or a lower alkyl ester thereof is used as a monomer used for a polyester unit of the polyester resin. Here, for exhibiting "strain hardening property", it is effective to perform partial crosslinking in a molecule of an amorphous resin in order to produce a branched polymer. To this end, it is preferable to use a trivalent or more polyfunctional compound. Accordingly, as a raw material monomer for the polyester unit, it is preferable to contain a trivalent or more carboxylic acid, an acid anhydride thereof, or a lower alkyl ester thereof, and/or a trihydric or higher alcohol. As a polyhydric alcohol monomer used for the polyester unit of the polyester resin, the following polyhydric alcohol monomer can be used.

Examples of a dihydric alcohol component can include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and a bisphenol represented by Formula (A) and a derivative thereof;

(A)

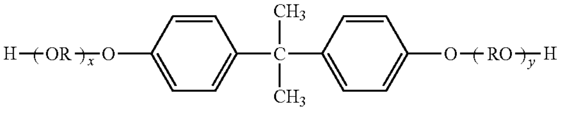

(wherein, R represents an ethylene group or a propylene group, x and y each independently represent an integer of 0 or more, and an average value of x+y is 0 or more and 10 or less), and diols represented by Formula (B), (B)

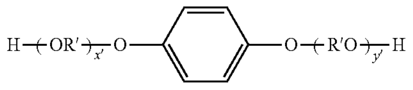

(wherein, R' represents $—CH_2CH_2—$, $—CH_2—CH(CH_3)—$, or $—CH_2—C(CH_3)_2—$, x' and y' each independently represent an integer of 0 or more, and an average value of x'+y' is 0 to 10).

Examples of a trihydric or higher alcohol component can include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methyl propanetriol, 2-methyl-1,2,4-butanetriol, trimethylolethane, trimethylolpropane, and 1,3,5-trihydroxymethylbenzene. Among them, glycerol, trimethylolpropane, and pentaerythritol are preferably used. These dihydric alcohols and trihydric or higher alcohols can be used alone or in combination.

The following polyvalent carboxylic acid monomers can be used as a polyvalent carboxylic acid monomer used for the polyester unit of the polyester resin.

Examples of a divalent carboxylic acid component can include maleic acid, fumaric acid, citraconic acid, itaconic acid, glutaconic acid, phthalic acid, isophthalic acid, terephthalic acid, succinic acid, adipic acid, sebatic acid, azelaic acid, malonic acid, n-dodecenyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, and anhydrides of these acids, and a lower alkyl ester thereof. Among them, maleic acid, fumaric acid, terephthalic acid, and n-dodecenyl succinic acid are preferably used.

Examples of a trivalent or more carboxylic acid and an acid anhydride thereof or a lower alkyl ester thereof can include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxy propane, 1,2,4-cyclohexanetricarboxylic acid, tetra(methylenecarboxyl) methane, 1,2,7,8-octanetetracarboxylic acid, pyromellitic acid, enpol trimer acid, and an acid anhydride thereof or a lower alkyl ester thereof. Among them, in particular, 1,2,4-benzenetricarboxylic acid, that is, trimellitic acid or a derivative thereof is preferably used in terms of low cost and easiness of reaction control. These divalent carboxylic acids and trivalent or more carboxylic acids can be used alone or in combination.

A method of producing the polyester unit of the present invention is not particularly limited, but a known method can be used. For example, the polyester resin is produced by simultaneously charging the alcohol monomer and carboxylic monomer described above into a reaction vessel and performing polymerization through an esterification reaction or a transesterification reaction, and a condensation reaction. In addition, a polymerization temperature is not particularly limited, but preferably in a range of 180° C. or higher and 290° C. or lower. In the polymerization of the polyester unit, for example, a titanium-based catalyst, a tin-based catalyst, or a polymerization catalyst such as zinc acetate, antimony trioxide, or germanium dioxide can be used. In particular, a polyester unit polymerized using a tin-based catalyst is more preferred in the binder resin of the present invention.

In addition, an acid value of the polyester resin is 5 mgKOH/g or more and 20 mgKOH/g or less. When a hydroxyl value is 20 mgKOH/g or more and 70 mgKOH/g or less, the amount of moisture adsorbed under a high temperature and high humidity environment can be suppressed, and a non-electrostatic adhesive force can be suppressed to be low. Therefore, it is preferable from the viewpoint of fogging properties.

In addition, the binder resin may contain a polyester resin as a main component and contain the following components. Examples thereof can include homopolymers of styrene such as polystyrene, poly-p-chlorostyrene, and polyvinyltoluene, and substituents thereof, styrene-based copolymers such as a styrene-p-chlorostyrene copolymer, a styrene-vinyltoluene copolymer, a styrene-vinylnaphthalene copolymer, a styrene-acrylic acid ester copolymer, and a styrene-methacrylic acid ester copolymer, a styrene-based copolymer resin, a polyvinyl chloride resin, a phenol resin, a natural resin-modified phenol resin, a natural resin-modified maleic acid resin, an acrylic resin, a methacrylic resin, a polyvinyl acetate resin, a silicone resin, a polyurethane resin, a polyamide resin, a furan resin, an epoxy resin, a xylene resin, a polyethylene resin, and a polypropylene resin. Further, a binder resin obtained by mixing a low molecular weight resin and a high molecular weight resin with each other may be used. A content ratio of the high molecular weight resin to the low molecular weight resin is preferably 40/60 or more and 85/15 or less in terms of mass from the viewpoint of low-temperature fixability and hot offset resistance.

<Colorant>

The toner particle in the present invention contains a colorant. Examples of the colorant can include the following.

Examples of a black colorant can include carbon black; and a black mixture of a yellow colorant, a magenta colorant, and a cyan colorant. As the colorant, a pigment may be used alone, but a dye and a pigment are more preferably used in combination to improve definition from the viewpoint of the image quality of a full-color image.

Examples of a pigment for a magenta toner can include the following pigments: C.I. Pigment Reds 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C.I. Pigment Violet 19; and C.I. Pigment Vat Reds 1, 2, 10, 13, 15, 23, 29, and 35.

Examples of a dye for a magenta toner can include the following dyes: oil dyes such as C.I. Solvent Reds 1, 3, 8, 23, 24, 25, 27, 30, 49, 81, 82, 83, 84, 100, 109, and 121; C.I. Disperse Red 9; C.I. Solvent Violets 8, 13, 14, 21, and 27; and C.I. Disperse Violet 1, and basic dyes such as C.I. Basic Reds 1, 2, 9, 12, 13, 14, 15, 17, 18, 22, 23, 24, 27, 29, 32, 34, 35, 36, 37, 38, 39, and 40; and C.I. Basic Violets 1, 3, 7, 10, 14, 15, 21, 25, 26, 27, and 28.

Examples of a pigment for a cyan toner can include the following pigments: C.I. Pigment Blues 2, 3, 15:2, 15:3, 15:4, 16, and 17; C.I. Vat Blue 6; C.I. Acid Blue 45; and a copper phthalocyanine pigment having a phthalocyanine skeleton substituted with 1 to 5 phthalimide methyl groups.

An example of a dye for a cyan toner can include C.I. Solvent Blue 70.

Examples of a pigment for a yellow toner can include the following pigments: C.I. Pigment Yellows 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C.I. Vat Yellows 1, 3, and 20.

An example of a dye for a yellow toner can include C.I. Solvent Yellow 162.

These colorants may be used alone or as a mixture or used in a solid solution state. The colorant is selected from the viewpoint of hue angle, chroma, brightness, light fastness, OHP transparency, and dispersibility in a toner. A content of the colorant is preferably 0.1 parts by mass or more and 30.0 parts by mass or less with respect to a total amount of a binder component.

<Developer>

The toner in the present invention can be used as a single-component developer or can be used as a two-component developer by being mixed with a magnetic carrier in order to suppress charge localization on a toner surface. Examples of the magnetic carrier can include general known magnetic carriers such as iron oxide; metal particles such as iron, lithium, calcium, magnesium, nickel, copper, zinc, cobalt, manganese, chromium, and rare earth, an alloy particle thereof, and an oxide particle thereof; a magnetic body such as ferrite; and a magnetic body-dispersed resin carrier (so-called a resin carrier) containing a magnetic body and a binder resin holding the magnetic body in a dispersed state. In a case where the toner is mixed with the magnetic carrier to be used as a two-component developer, a mixing ratio of the magnetic carrier in this case is preferably 2% by mass or more and 15% by mass or less and more preferably 4.0% by mass or more and 13.0% by mass or less in terms of a toner concentration in the two-component developer.

<Method of Producing Toner>

A method of producing toner particles is not particularly limited, but a pulverization method is preferred from the viewpoint of a toner material such as a pigment.

Hereinafter, the procedure for producing a toner in the pulverization method will be described.

In a raw material mixing step, predetermined amounts of a binder resin, a release agent, a colorant, and an optional component such as a charge control agent are weighed, formulated, and mixed as materials constituting toner particles. Examples of a mixing apparatus can include a double cone mixer, a V-type mixer, a drum type mixer, a super mixer, a Henschel mixer, a Nauta mixer, and Mechano hybrid (manufactured by NIPPON COKE & ENGINEERING CO., LTD.).

Next, the mixed materials are melt-kneaded to disperse a pigment or the like in the binder resin. In the melt-kneading step, a batch type kneader such as a pressure kneader or a Banbury mixer or a continuous kneader can be used. A single-screw or twin-screw extruder is mainly used in terms of superiority of continuous production. Examples of the extruder can include a KTK type twin-screw extruder (manufactured by Kobe Steel, Ltd.), a TEM type twin-screw extruder (manufactured by Toshiba Machine Co., Ltd.), a PCM kneader (manufactured by Ikegai Machinery Co.), a twin-screw extruder (manufactured by KCK Engineering), a Co-Kneader (manufactured by Buss AG), and a KNEADEX (manufactured by NIPPON COKE & ENGINEERING CO., LTD.). Furthermore, the resin composition obtained by the melt-kneading may be rolled using a two-roll mill and may be cooled with water in a cooling step.

Next, the cooled resin composition is pulverized in a pulverization step until to obtain a desired particle size. In the pulverization step, the composition is coarsely pulverized with a pulverizer such as a crusher, a hammer mill, or a feather mill. Furthermore, the composition is finely pulverized with, for example, a fine pulverizer such as a Kryptron System (manufactured by Kawasaki Heavy Industries Ltd.), a Super Rotor (manufactured by NISSHIN ENGINEERING INC.), a Turbo Mill (manufactured by TURBO KOGYO CO., LTD.), or an air jet type fine pulverizer. Thereafter, the pulverized composition is classified, if necessary, using a classifier or a sieving machine, such as an Elbow-Jet of an inertial classification system, a Turboplex of a centrifugal classification system, a TSP separator, or a Faculty. An Elbow-Jet manufactured by Nittetsu Mining Co., Ltd. is used, and a Turboplex, a TSP separator, or a Faculty manufactured by Hosokawa Micron Corporation is used.

Thereafter, the toner particles are subjected to a surface treatment by heat to fix the external additive to the toner particle in the heat spheroidizing treatment step. For example, the surface treatment can be performed with hot air using a surface heat treatment apparatus illustrated in FIG. 1. A mixture quantitatively fed by a raw material quantitative feeder 1 is introduced by a compressed gas adjusted by a compressed gas flow rate adjuster 2 into an introduction pipe 3 installed on an extension line of the raw material quantitative feeder 1. The mixture passed through the introduction pipe 3 is uniformly dispersed by a conical protruding member 4 installed at the central portion of the introduction pipe 3, is introduced into feed pipes 5 radially extending in 8 directions, and is introduced into a treatment chamber 6 where a heat treatment is performed. At this time, a flow of a mixture fed to the treatment chamber 6 is regulated by a regulating unit 9 for regulating the flow of the mixture, the regulating unit 9 being provided in the treatment chamber 6. Accordingly, the mixture fed to the treatment chamber 6 is subjected to the heat treatment while being whirled in the treatment chamber 6, and then the mixture is cooled.

Hot air for heat-treating the fed mixture is fed from a hot air feeder 7 and is distributed by a distribution member 12, and the hot air is spirally swirled and introduced into the treatment chamber 6 by a swirling member 13 for swirling the hot air. In this configuration, the swirling member 13 for swirling the hot air has a plurality of blades, and the swirl of the hot air can be controlled depending on the number of blades or angles between the blades. The temperature of the hot air to be fed into the treatment chamber 6 at an outlet of the hot air feeder 7 is preferably 100° C. to 300° C. When the temperature at the outlet 11 of the hot air feeder is within the above range, the toner particles can be uniformly subjected to a spheroidizing treatment while preventing the fusion or coalescence of the toner particles due to excessive heating of the mixture. The larger the angle between the blades in a longitudinal direction of the apparatus is, and the larger the number of blades is, such that the hot air can be further whirled.

Furthermore, the heat-treated toner particles are cooled by cold air fed from a cold air feeder 8. The temperature of the cold air fed from the cold air feeder 8 is preferably −20° C. to 30° C. When the temperature of the cold air is within the above range, the heat-treated toner particles can be efficiently cooled, and the fusion or coalescence of the heat-treated toner particles can be prevented without inhibiting the uniform spheroidizing treatment of the mixture. The amount of absolute moisture of the cold air is preferably 0.5 $g/m^3$ or more and 15.0 $g/m^3$ or less.

Next, the cooled heat-treated toner particles are recovered by a recovery unit 10 positioned at a lower end of the treatment chamber 6. The recovery unit includes a blower (not illustrated) at the tip thereof and the toner particles are sucked and conveyed by the blower.

In addition, a powder particle feed port 14 is provided so that the swirling direction of the mixture fed and the swirling direction of the hot air are identical to each other, and the recovery unit 10 of the surface heat treatment apparatus is provided at an outer peripheral portion of the treatment chamber 6 so that the swirling direction of swirled powder particles is maintained. Furthermore, the cold air fed from the cold air feeder 8 is configured to be fed from the outer peripheral portion of the apparatus to an inner circumferential surface of the treatment chamber 6 from a horizontal and tangential direction. The swirling direction of the toner particles to be fed from the powder particle feed port 14, the swirling direction of the cold air fed from the cold air feeder 8, and the swirling direction of the hot air fed from the hot air feeder are all identical to one another. Therefore, since no turbulence occurs in the treatment chamber 6, a swirl flow in the apparatus is strengthened, a strong centrifugal force is applied to the toner particles, and the dispersibility of the toner particles is additionally improved, toner particles having a small number of coalesced particles and having a uniform shape can thus be obtained. A number average particle size of the toner particles is preferably 3 μm or more and 30 μm or less.

Thereafter, the heat-treated toner particles are divided into a fine powder and a coarse powder. For example, the dividing is performed using an inertial classification type Elbow Jet (manufactured by Nittetsu Mining Co., Ltd.). A surface of each of the heat-treated toner particles divided into two powders is subjected to an external addition treatment with a desired amount of an external additive. As a method of the external addition treatment, stirring and mixing is performed using a mixing apparatus such as a double cone mixer, a V-type mixer, a drum type mixer, a super mixer, a Henschel mixer, or a Nauta mixer as an external addition machine. Alternatively, an example of the method can include a method such as stirring and mixing performed using a mixing apparatus such as a Mechanohybrid (manufactured by NIPPON COKE & ENGINEERING CO., LTD.) or a Nobilta (manufactured by Hosokawa Micron Corporation). In this case, the external addition treatment may also be performed using an external additive such as a fluidizing agent, if necessary.

By alternately repeating the surface treatment with hot air and the external addition treatment described above a plurality of times and repeating only the external addition treatment a plurality of times, it is possible to obtain a toner having an internal structure in which two or more concentration peaks of the external additive in a depth direction in a depth region from the outermost surface of the toner to 500 nm. Hereinafter, methods of measuring various physical properties of a toner and a raw material will be described.

<Water Washing Treatment Method>

A water washing treatment of the toner in the present invention is performed as follows. An aqueous sucrose solution obtained by dissolving 20.7 g of sucrose (manufactured by Kishida Chemical Co., Ltd.) in 10.3 g of ion-exchanged water is sufficiently mixed with 6 ml of a surfactant (trade name: Contaminon N, manufactured by FUJIFILM Wako Pure Chemical Corporation, aqueous solution containing 10% by mass of a neutral detergent for washing precision measuring instrument (pH 7) composed of a nonionic surfactant, an anionic surfactant, and an organic builder) in a 30 ml glass vial, thereby preparing a dispersion liquid. In addition, VCV-30 (trade name) (outer diameter: 35 mm and height: 70 mm) manufactured by Nichiden-rika glass Co., Ltd.) can be used as the glass vial, for example. 1.0 g of a toner is added to the dispersion liquid, and the toner is allowed to stand to cause natural sedimentation thereof, thereby preparing a dispersion liquid before treatment. The dispersion liquid before treatment is shaken with a shaker (YS-8D: manufactured by Yayoi Co., Ltd.) at a shaking rate of 200 rpm for 5 minutes to remove inorganic fine particles from the surface of the toner particle. The inorganic fine particles removed from the toner particles in which the inorganic fine particles remain are separated using a centrifuge separator. The centrifugation step is performed at 3,700 rpm for 30 minutes. The toner in which the inorganic fine particles remain is collected by suction filtration and is dried to obtain a toner washed with water.

<Coating Rate of Silica External Additive and Coating Rate of Strontium Titanate External Additive after Water Washing Treatment>

In the toner subjected to the water washing treatment described above, the toner particles are imaged using Hitachi's ultrahigh resolution field emission scanning electron microscope S-4800 (Hitachi High-Technologies Corporation), and 20 images of the surface of the toner particle are randomly sampled. The image information is binarized by image analysis software (for example, trade name: Image-Pro Plus ver. 5.0, manufactured by Nippon Roper K.K.) using a difference in brightness between a toner particle surface portion and an external additive portion. The image is divided into an area of the external additive portion and the other area Sother by the binarization. The area of the external additive portion is composed of the silica particles and the strontium titanate particles, and can be distinguished by the shape as follows. That is, the shape of the silica particle is amorphous or spherical, whereas the shape of the strontium titanate particle is a rectangular parallelepiped or cube shape with rounded corners. An area $SSiO_2$ occupied by the silica particles and an area $SSrTiO_3$ occupied by the strontium titanate particles in the area of the external additive portion are determined by the distinction based on the shape. Then, a coating rate (%) $\sigma SiO_2$ of the toner particles with the silica particles is calculated by the following Equation (1).

$$\sigma SiO_2(\%) = SSiO_2/(Sother + SSiO_2 + SSrTiO_3)\times 100 \quad \text{Equation (1)}$$

In addition, a coating rate (%) $\sigma SrTiO_3$ of the toner particles with the strontium titanate particles is calculated by the following Equation (2).

$$\sigma SrTiO_3(\%) = SSrTiO_3/(Sother + SSiO_2 + SSrTiO_3)\times 100 \quad \text{Equation (2)}$$

<Method of Measuring Depth Profile of Element Distribution by X-ray Photoelectron Spectroscopy>

A depth profile of each element using the toner as a sample is measured as follows using X-ray photoelectron spectroscopy (hereinafter, referred to as "XPS"). The toner is filled in a sample set hole having a diameter of 2 mm and a depth of 2 mm processed on an XPS-dedicated platen to set a sample. Then, under a condition in which an XPS apparatus described below is used, an X-ray irradiation location and a sputtering location by GCIB irradiation are set to the sample set hole, and measurement is performed.

Used apparatus: PHI 5000 VersaProbe II manufactured by ULVAC-PHI Inc.

Irradiation ray: Al-Kα ray
Output: 100 u 25 W 15 kV
Photoelectron acceptance angle: 45°
PassEnergy: 58.70 eV
Stepsize: 0.125 eV
XPS peak: C2p, O2p, Si2p, Ti2p, Sr3d
Measurement range: 300 μm×200 μm
GUN type: GCIB
Time: 15 min
Interval: 1 min
SputterSetting: 20 kV <Method of Measuring Softening Point of Resin Constituting Toner Particle>

A softening point of the resin constituting the toner particle is measured using a constant-load extrusion type capillary rheometer "flow property evaluating apparatus, Flow Tester CFT-500D" (manufactured by Shimadzu Corporation) according to a manual accompanying the apparatus. In this apparatus, the temperature of a measurement sample filled in a cylinder is raised to melt the measurement sample while applying a constant load by a piston from above the measurement sample, and the molten measurement sample is extruded through a die disposed at the bottom of the cylinder, such that a flow curve indicating a relationship between the temperature and a descending level of the piston can be obtained.

In the present invention, a "melting temperature in a ½ method" described in the manual accompanying the "flow property evaluating apparatus, Flow Tester CFT-500D" is defined as a softening point. The melting temperature in the ½ method is calculated as follows. First, ½ of a difference between a descending level Smax of the piston at a time when the outflow is finished and a descending level Smin of the piston at a time when the outflow is started is calculated (½ of the difference is defined as X, and X=(Smax−Smin)/2). Then, the temperature in the flow curve when the descending level of the piston reaches X in the flow curve is a melting temperature in the ½ method.

About 1.0 g of a resin as the measurement sample is compression-molded using a tablet compression molder (for example, NT-100H, manufactured by NPa System Co., Ltd.) under an environment of 25° C. at about 10 MPa for about 60 seconds to use a cylindrical shape having a diameter of about 8 mm.

Measurement conditions of the CFT-500D are as follows.
Test mode: temperature rise method
Start temperature: 40° C.
Reaching temperature: 200° C.
Measurement interval: 1.0° C.
Temperature rising rate: 4.0° C./min
Piston cross section area: 1.000 $cm^2$
Test load (piston load): 10.0 kgf (0.9807 MPa)
Preheating time: 300 seconds
Diameter of hole of die: 1.0 mm
Length of die: 1.0 mm

EXAMPLES

Hereinafter, the present invention will be described in more detail using Examples and Comparative Examples. However, the present invention is not limited thereto. Note that all of the number of parts and % in the Examples and Comparative Examples are based on a mass, unless specifically indicated otherwise.

Production Example of Strontium Titanate Particles

Metatitanic acid obtained by a sulfuric acid method was subjected to an iron removal and bleaching treatment, and then, an aqueous sodium hydroxide solution was added to adjust a pH to 9.1 to perform a desulfurization treatment. Thereafter, the solution was neutralized by hydrochloric acid to have a pH of 5.7, a precipitate was collected by filtration, and the collected precipitate was washed. Water was added to the washed cake to obtain a 1.86 mol/L slurry in terms of $TiO_2$, and then hydrochloric acid was added to the slurry to adjust the pH to 1.4 to perform a deflocculation treatment. After the desulfurization and deflocculation, 1.87 moles of the metatitanic acid in terms of $TiO_2$ were collected and charged into a 3 L reaction vessel. 2.15 moles of an aqueous strontium chloride solution were added to the deflocculated metatitanic acid slurry to set a molar ratio of $SrO/TiO_2$ to 1.16. An appropriate amount of water was added to adjust a concentration of Ti in a reaction system to 1.038 mol/L in terms of $TiO_2$. Next, the slurry was heated to 89° C. while performing stirring and mixing, and then 440 mL of a 12 mol/L aqueous sodium hydroxide solution was added over 40 minutes. Further, the temperature was raised to 94° C. and stirring was continued at 94° C. for 45 minutes. Thereafter, the reaction slurry was cooled to 40° C., hydrochloric acid was added to have a pH of 4.9, and stirring was continued for 20 minutes. The resulting precipitate was washed by decantation, filtration and separation was performed, and drying was performed in the atmosphere at 120° C. for 8 hours. Subsequently, 300 g of the dried product was charged into a dry particle composing machine (manufactured by Hosokawa Micron Corporation, Nobilta NOB-130). A stirring treatment was performed at a treatment temperature of 30° C. with a rotary treatment blade at 95 m/sec for 10 minutes. Further, hydrochloric acid was added to the dried product to have a pH of 0.1, and stirring was continued for 1 hour. The resulting precipitate was decanted and washed. The slurry containing the precipitate was adjusted to 40° C., hydrochloric acid was added to adjust the pH to 2.5, and stirring and mixing was performed for 1 hour. Next, each of isobutyltrimethoxysilane and trifluoropropyltrimethoxysilane was added in an amount of 4.6% by mass with respect to a solid content, and stirring was performed for 10 hours. Further, a 5 mol/L aqueous sodium hydroxide solution was added to adjust a pH of the slurry to 6.1, and stirring was continued for 1 hour. Filtration and washing were performed and the obtained cake was dried in the atmosphere at 130° C. for 8 hours to obtain strontium titanate particles. A number average particle size of the obtained strontium titanate was about 37 nm.

Production Example of Silica Particles A

A gas phase-processed silica powder having a BET specific surface area of 25 $m^2/g$ was charged into a reaction tank, 4 g of hexamethylsilazane was sprayed onto 100 g of the silica powder while performing stirring under a nitrogen atmosphere, and stirring was performed at an atmosphere temperature of 204° C. for 30 minutes. The "gas phase-processed silica powder" means a silica powder produced by a dry method (gas phase method). Thereafter, the silica powder was cooled to 24° C. to obtain silica particles A. A number average particle size of the obtained silica particles A was 130 nm.

Production Example of Silica Particles B

A gas phase-processed silica powder having a BET specific surface area of 250 $m^2/g$ was charged into a reaction tank, 25 g of hexamethylsilazane was sprayed onto 100 g of the silica powder while performing stirring under a nitrogen atmosphere, and stirring was performed at an atmosphere temperature of 204° C. for 30 minutes. Thereafter, the silica powder was cooled to 24° C. to obtain silica particles B. A number average particle size of the obtained silica particles B was 8 nm.

Production Example of Amorphous Polyester Resin

Polyoxypropylene (2,2)-2,2-bis(4-hydroxyphenyl)propane: 73.3 parts by mass (0.20 mol, 100.0 mol % with respect to the total number of moles of polyhydric alcohol)

Terephthalic acid: 22.4 parts by mass (0.13 mol, 82.0 mol % with respect to the total number of moles of polyvalent carboxylic acid)

Adipic acid: 4.3 parts by mass (0.03 mol, 18.0 mol % with respect to the total number of moles of polyvalent carboxylic acid)

Titanium tetrabutoxide (esterification catalyst): 0.51 parts by mass

The materials described above were weighed in a reaction tank equipped with a cooling pipe, a stirrer, a nitrogen introduction tube, and a thermocouple. Next, the inside of a flask was substituted with a nitrogen gas, the temperature was gradually raised while performing stirring, stirring was performed at 202° C., and a reaction was performed for 4.5 hours, thereby obtaining a binder resin A. A softening point of the obtained amorphous polyester resin was 90° C.

Production Example of Styrene Acrylic Resin 850 g of xylene was added to a 2 L four-necked glass flask equipped with a thermometer, a stainless steel stirring rod, a flow down type condenser, and a nitrogen introduction tube, and the temperature was raised to 150° C. after nitrogen substitution.

Styrene: 1,700 parts by mass n-Butyl acrylate: 250 parts by mass

Polyoxypropylene (2,2)-2,2-bis(4-hydroxyphenyl)propane: 50 parts by mass

Dicumyl peroxide: 80 parts by mass

Thereafter, the mixture of the above materials was added dropwise with a dropping funnel over 4 hours and a reaction was performed for 4 hours while maintaining the temperature at 150° C. Thereafter, the temperature was raised to 200° C., and xylene was distilled off under reduced pressure, thereby obtaining a styrene acrylic resin.

A softening point of the obtained styrene acrylic resin was 108° C.

Synthesis Example of Crystalline Polyester Resin

Dodecanediol: 34.5 parts by mass (0.29 mol, 100.0 mol % with respect to the total number of moles of polyhydric alcohol)

Sebacic acid: 65.5 parts by mass (0.28 mol, 100.0 mol % with respect to the total number of moles of polyvalent carboxylic acid)

The materials described above were weighed in a reaction tank equipped with a cooling pipe, a stirrer, a nitrogen introduction tube, and a thermocouple. Next, the inside of a flask was substituted with a nitrogen gas, the temperature was gradually raised while performing stirring, and a reaction was performed for 3 hours while performing stirring at 140° C.

Tin 2-ethylhexanoate: 0.5 parts by mass

Thereafter, the above materials were added, the pressure in the reaction tank was lowered to 8.3 kPa, a reaction was performed for 4 hours while maintaining the temperature at 200° C., and the pressure in the reaction tank was gradually released and returned to normal pressure, thereby obtaining a crystalline polyester resin. A softening point of the obtained crystalline polyester resin was 82° C.

Production Example of Toner

Production Example of Toner 1

The type of the binder resin was an amorphous polyester resin.

Binder resin: 100 parts

Crystalline polyester resin: 5 parts

Fischer-Tropsch wax (melting point: 90° C.): 6 parts

C.I. Pigment Blue 15:3: 4 parts

The above materials were pre-mixed with a Henschel mixer (trade name: FM-75, manufactured by Mitsui Mining CO., LTD.), and the mixture was melt-kneaded at 160° C. by a twin-screw kneading extruder (PCM-30, manufactured by Ikegai Corp.). After the obtained kneaded product was cooled and then coarsely pulverized with a hammer mill to 1 mm or less, fine pulverization was performed with a mechanical pulverizer (trade name: T-250, manufactured by Turbo Kogyo Co., Ltd.). The obtained finely pulverized product was classified using a Faculty (trade name: F-300, manufactured by Hosokawa Micron Corporation). In the operating conditions, a classification rotor rotation speed was 11,000 rpm and a dispersion rotor rotation speed was 7,200 rpm. Thus, classified particles 1 were obtained.

Next, the following a "first-stage external addition treatment" was performed on the obtained classified particles 1.

Classified particles 1: 100 parts
Silica particles A: 1.0 part
Silica particles B: 1.4 parts
Strontium titanate particles: 1.4 parts The above materials were mixed with using a Henschel mixer (trade name: FM-10C, manufactured by NIPPON COKE & ENGINEERING CO., LTD.). In the operating conditions of the Henschel mixer, a rotation speed was 4,000 rpm, a rotation time was 2 minutes, and a heating temperature was room temperature. Thereafter, the heat treatment was performed by the surface heat treatment apparatus illustrated in FIG. 1 to obtain particles 1 subjected to a first-stage external addition heat treatment. In the operating conditions of the surface heat treatment apparatus, a feed amount was 1 kg/hr, a hot air temperature was 250° C., a hot air flow rate was 6 $m^3$/min, a cold air temperature was −5° C., a cold air flow rate was 4 $m^3$/min, a blower air flow rate was 20 $m^3$/min, and an injection air flow rate was 1 $m^3$/min.

Then, the obtained particles 1 subjected to the first-stage external addition heat treatment were subjected to a "second-stage external addition treatment" using the following materials to obtain particles 1 subjected to a second-stage external addition heat treatment. The operating conditions of the surface heat treatment apparatus were set as in the first-stage external addition treatment except that the feed amount was 2.0 kg/hr and the hot air temperature was 190° C.

Particles 1 subjected to first-stage external addition heat treatment: 100 parts
Silica particles B: 1.1 parts
Strontium titanate particles: 2.1 parts Then, the obtained particles 1 subjected to the second-stage external addition heat treatment were subjected to a "third-stage external addition treatment" using the following materials to obtain treated particles 1. Only an external addition step was performed by a Henschel mixer without using the surface heat treatment apparatus. The operating conditions of the Henschel mixer were set as in the first-stage external addition treatment except that the heating temperature in the external addition step was 40° C.

Particles 1 subjected to second-stage external addition heat treatment: 100 parts
Silica particles A: 0.2 parts
Silica particles B: 1.2 parts
Strontium titanate particles: 0.1 parts The heat-treated particles 1 obtained in the above were subjected to removal of a coarse and fine powder using an Elbow-Jet of an inertial classification system (manufactured by Nittetsu Mining Co., Ltd.) to obtain toner particles 1 having a number average particle size of 5.5 μm.

The following "final external addition treatment" was performed on the obtained toner particles 1.

Toner particles 1: 100 parts
Silica particles A: 0.2 parts
Silica particles B: 0.4 parts
Strontium titanate particles: 0.7 parts The above materials were mixed at a rotation speed of 67 $s^{-1}$ (4,000 rpm) and an external addition temperature of room temperature for 2 minutes of a rotation time using a Henschel mixer (trade name: FM-10C, manufactured by NIPPON COKE & ENGINEERING CO., LTD.), and the mixture was passed through an ultrasonic vibration sieve with a mesh opening of 54 μm, thereby obtaining a toner 1.

Figure 5:
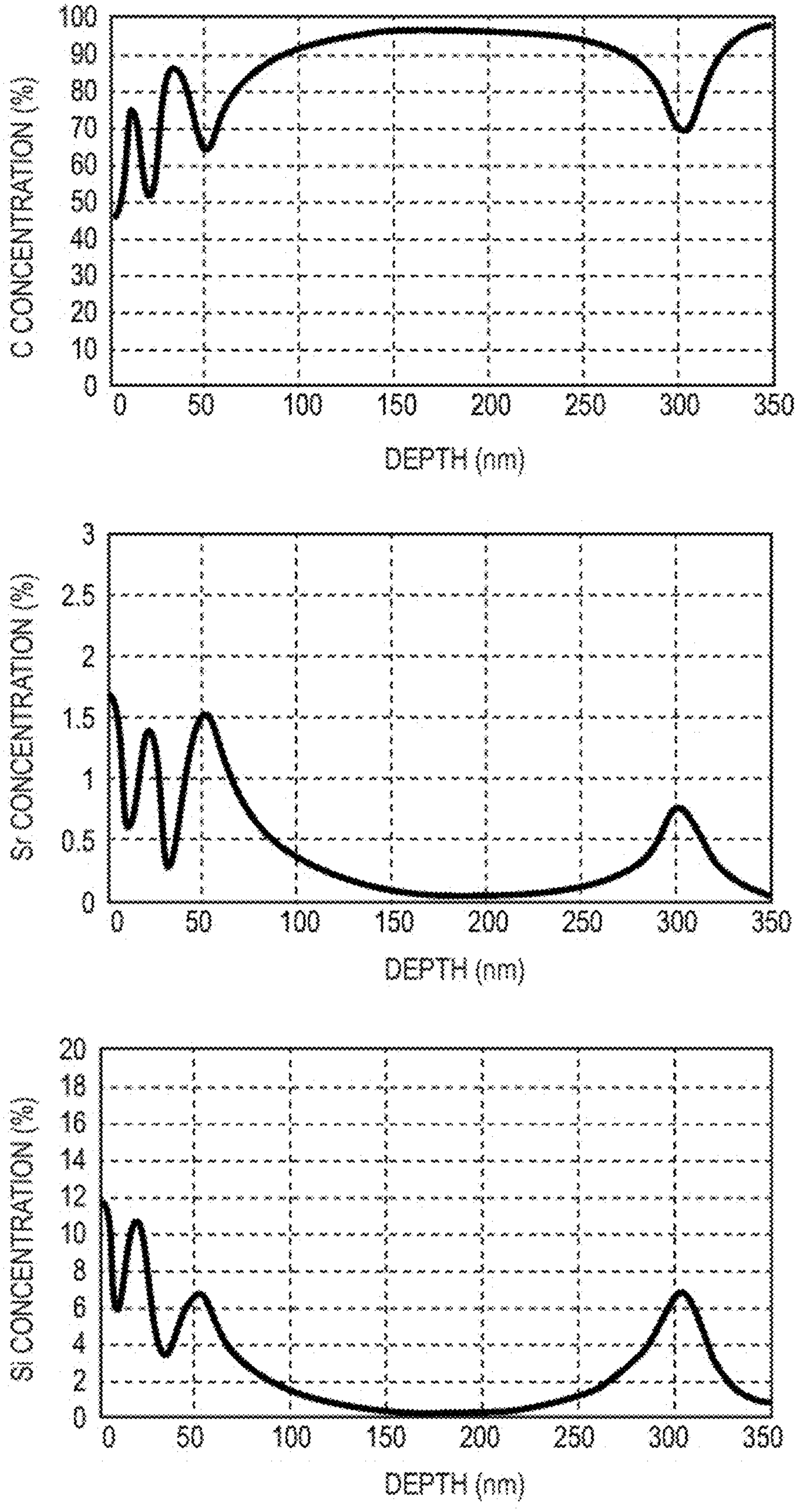
FIG. 5 is an explanatory view of a depth profile of each of a carbon element, a strontium element, and a silicon element by XPS of a toner particle 1.

As a result of measuring the depth profile by XPS for the produced toner 1, it was confirmed that minimum points of a concentration of a carbon element existed at depth positions of 20 nm, 50 nm, and 300 nm from the outermost surface of the particle. Here, the outermost surface of the particle is the outermost surface of a toner particle or a secondary particle in which inorganic fine particles as an external additive are attached to the toner particle. Minimum values of the carbon concentration at the minimum points were 52.3%, 65.0%, and 70.3%, respectively. Then, it was confirmed that the concentration of the silicon element and the concentration of the strontium element had maximum values at each of the depth positions. The maximum values of the concentration of the silicon element were 11.0%, 7.0%, and 7.0%, respectively, and the maximum values of the concentration of the strontium element were 1.4%, 1.5%, and 0.8%, respectively. In addition, on the surface of the toner particle after a water washing treatment of the toner 1, a coating rate of the particle with the silica external additive was 34.0%, and a coating rate of the particle with a $SrTiO_3$ external additive was 11.1%. FIG. 5 illustrates depth profiles of the carbon element, the strontium element, and the silicon element.

Production Examples of Toners 2 to 31

In Production Example of the toner 1, the type of the binder resin, the presence or absence of addition of the crystalline polyester, the addition amount of strontium titanate, and the addition amounts of the silica particles A and the silica particles B were changed as shown in Table 1. In addition, the operating conditions of the surface heat treatment apparatuses and the Henschel mixers in the "first-stage external addition treatment", the "second-stage external addition treatment", and the "third-stage external addition treatment" were set so that the minimum points of the carbon concentration in the depth profile by XPS were at the depth position shown in Table 2. Further, as shown in Table 1, an example in which the condition was changed so that the "third-stage external addition treatment" was not performed or both the "third-stage external addition treatment" and the "second-stage external addition treatment" were not performed was also performed. Except for this, the same operation as that of Production Example of the toner 1 was performed to obtain toners 2 to 31. It was confirmed that all of the toners had maximum points of the concentration of the silicon element and the concentration of the strontium element at the minimum points of the concentration of the carbon element. In addition, Table 2 also shows the minimum value of the concentration of the carbon element at each of the depth positions, the maximum values of the concentration of the silicon element and the concentration of the strontium element corresponding to the depth position, and the coating rate of the particle with the silica external additive and the coating rate of the particle with the $SrTiO_3$ external additive on the surface of the toner particle after the water washing treatment.

TABLE 1

| | Binder resin Type | Crystalline polyester Addition amount (% by mass) | Final external addition treatment: Number of parts of silica particles A | Final external addition treatment: Number of parts of silica particles B | Final external addition treatment: Number of parts of $SrTiO_3$ particles | Third-stage external addition treatment: Number of parts of silica particles A | Third-stage external addition treatment: Number of parts of silica particles B | Third-stage external addition treatment: Number of parts of $SrTiO_3$ particles | Third-stage external addition treatment: Presence or absence of heating in external addition step | Third-stage external addition treatment: Presence or absence of heat spheroidizing treatment |
|---|---|---|---|---|---|---|---|---|---|---|
| Toner 1 | Amorphous polyester | Contained | 2 | 4 | 7 | 2 | 12 | 1 | Presence | Absence |
| Toner 2 | Amorphous polyester | Not contained | 2 | 5 | 0 | 0 | 10 | 9 | Presence | Absence |
| Toner 3 | Amorphous polyester | Contained | 2 | 9 | 15 | 2 | 26 | 0 | Absence | Presence |
| Toner 4 | Amorphous polyester | Contained | 2 | 6 | 21 | 1 | 29 | 0 | Absence | Presence |
| Toner 5 | Amorphous polyester | Not contained | 2 | 2 | 19 | 2 | 23 | 0 | Presence | Absence |
| Toner 6 | Amorphous polyester | Contained | 2 | 8 | 21 | 1 | 27 | 0 | Presence | Absence |
| Toner 7 | Amorphous polyester | Contained | 2 | 8 | 21 | 1 | 33 | 0 | Absence | Presence |
| Toner 8 | Amorphous polyester | Contained | 2 | 7 | 26 | 1 | 20 | 0 | Absence | Presence |
| Toner 9 | Amorphous polyester | Contained | 2 | 7 | 31 | 1 | 20 | 0 | Absence | Presence |
| Toner 10 | Amorphous polyester | Contained | 1 | 1 | 11 | | | Not performed | | |
| Toner 11 | Amorphous polyester | Contained | 2 | 9 | 11 | | | Not performed | | |
| Toner 12 | Amorphous polyester | Not contained | 2 | 12 | 11 | | | Not performed | | |
| Toner 13 | Amorphous polyester | Contained | 2 | 12 | 15 | | | Not performed | | |
| Toner 14 | Amorphous polyester | Not contained | 2 | 11 | 16 | | | Not performed | | |
| Toner 15 | Amorphous polyester | Contained | 2 | 8 | 13 | | | Not performed | | |
| Toner 16 | Amorphous polyester | Not contained | 2 | 8 | 19 | | | Not performed | | |
| Toner 17 | Styrene acryl | Not contained | 2 | 8 | 28 | | | Not performed | | |
| Toner 18 | Amorphous polyester | Contained | 2 | 8 | 14 | | | Not performed | | |
| Toner 19 | Amorphous polyester | Contained | 2 | 7 | 13 | | | Not performed | | |
| Toner 20 | Amorphous polyester | Contained | 2 | 9 | 2 | | | Not performed | | |
| Toner 21 | Amorphous polyester | Contained | 2 | 9 | 2 | | | Not performed | | |
| Toner 22 | Amorphous polyester | Contained | 2 | 9 | 2 | | | Not performed | | |
| Toner 23 | Styrene acryl | Not contained | 2 | 9 | 28 | | | Not performed | | |
| Toner 24 | Amorphous polyester | Contained | 2 | 17 | 2 | | | Not performed | | |
| Toner 25 | Amorphous polyester | Not contained | 1 | 1 | 11 | | | Not performed | | |
| Toner 26 | Amorphous polyester | Not contained | 2 | 4 | 7 | 2 | 26 | 20 | Absence | Presence |
| Toner 27 | Styrene acryl | Not contained | 2 | 7 | 22 | | | Not performed | | |
| Toner 28 | Amorphous polyester | Not contained | 2 | 0 | 22 | | | Not performed | | |
| Toner 29 | Amorphous polyester | Not contained | 2 | 3 | 24 | | | Not performed | | |
| Toner 30 | Amorphous polyester | Not contained | 2 | 0 | 20 | | | Not performed | | |
| Toner 31 | Amorphous polyester | Not contained | 2 | 0 | 21 | | | Not performed | | |

| | Second-stage external addition treatment: Number of parts of silica particles A | Second-stage external addition treatment: Number of parts of silica particles B | Second-stage external addition treatment: Number of parts of $SrTiO_3$ particles | Second-stage external addition treatment: Presence or absence of heating in external addition step | Second-stage external addition treatment: Presence or absence of heat spheroidizing treatment | First-stage external addition treatment: Number of parts of silica particles A | First-stage external addition treatment: Number of parts of silica particles B | First-stage external addition treatment: Number of parts of $SrTiO_3$ particles | First-stage external addition treatment: Presence or absence of heating in external addition step | First-stage external addition treatment: Presence or absence of heat spheroidizing treatment |
|---|---|---|---|---|---|---|---|---|---|---|
| Toner 1 | 0 | 11 | 21 | Absence | Presence | 10 | 14 | 14 | Absence | Presence |
| Toner 2 | 10 | 15 | 36 | Absence | Presence | 10 | 14 | 14 | Absence | Presence |
| Toner 3 | 5 | 6 | 50 | Presence | Absence | 5 | 8 | 9 | Presence | Presence |
| Toner 4 | 5 | 13 | 0 | Absence | Presence | 5 | 2 | 81 | Presence | Presence |
| Toner 5 | 5 | 10 | 41 | Presence | Presence | 7 | 13 | 0 | Presence | Absence |
| Toner 6 | 5 | 15 | 0 | Absence | Presence | 5 | 0 | 141 | Absence | Presence |
| Toner 7 | 5 | 14 | 0 | Absence | Presence | 5 | 0 | 163 | Absence | Presence |

TABLE 1-continued

| | | | | | | | | | | |
|---|---|---|---|---|---|---|---|---|---|---|
| Toner 8 | 5 | 13 | 0 | Presence | Presence | 5 | 5 | 34 | Absence | Presence |
| Toner 9 | 5 | 13 | 0 | Presence | Absence | 5 | 6 | 0 | Absence | Presence |
| Toner 10 | 2 | 16 | 1 | Absence | Absence | 0 | 11 | 21 | Absence | Absence |
| Toner 11 | 2 | 21 | 21 | Absence | Absence | 0 | 11 | 21 | Presence | Presence |
| Toner 12 | 5 | 22 | 0 | Absence | Presence | 5 | 7 | 57 | Absence | Presence |
| Toner 13 | 5 | 27 | 0 | Absence | Presence | 5 | 7 | 57 | Presence | Presence |
| Toner 14 | 5 | 21 | 0 | Absence | Presence | 5 | 7 | 57 | Absence | Presence |
| Toner 15 | 10 | 32 | 0 | Absence | Presence | 5 | 22 | 77 | Absence | Presence |
| Toner 16 | 5 | 21 | 0 | Absence | Presence | 5 | 8 | 36 | Absence | Presence |
| Toner 17 | 5 | 21 | 0 | Presence | Absence | 5 | 9 | 0 | Absence | Presence |
| Toner 18 | 10 | 46 | 0 | Absence | Presence | 0 | 0 | 72 | Presence | Presence |
| Toner 19 | 10 | 46 | 0 | Absence | Presence | 0 | 0 | 72 | Absence | Presence |
| Toner 20 | 0 | 0 | 43 | Presence | Presence | 12 | 76 | 0 | Absence | Presence |
| Toner 21 | 0 | 0 | 72 | Absence | Presence | 12 | 76 | 0 | Presence | Presence |
| Toner 22 | 0 | 0 | 72 | Absence | Presence | 12 | 76 | 0 | Presence | Presence |
| Toner 23 | 5 | 21 | 0 | Absence | Presence | 5 | 5 | 0 | Absence | Presence |
| Toner 24 | 0 | 0 | 72 | Presence | Presence | 12 | 76 | 0 | Absence | Presence |
| Toner 25 | 2 | 24 | 16 | Absence | Presence | 0 | 11 | 21 | Absence | Presence |
| Toner 26 | 0 | 8 | 18 | Presence | Presence | 10 | 14 | 14 | Absence | Presence |
| Toner 27 | 10 | 47 | 0 | Presence | Presence | 0 | 0 | 86 | Absence | Presence |
| Toner 28 | 10 | 37 | 0 | Absence | Presence | 0 | 0 | 103 | Absence | Presence |
| Toner 29 | | | Not performed | | | 10 | 37 | 9 | Presence | Presence |
| Toner 30 | | | Not performed | | | 28 | 28 | 9 | Absence | Presence |
| Toner 31 | | | Not performed | | | 28 | 28 | 9 | Presence | Presence |

TABLE 2

| | External additive coating rate after water washing | | Depth position where minimum point of concentration of carbon appears | | | Minimum value of concentration of carbon in depth profile by XPS | | | Maximum value of concentration of silicon at minimum point of concentration of carbon in depth profile by XPS | | | Maximum value of concentration of strontium at minimum point of concentration of carbon in depth profile by XPS | | |
|---|---|---|---|---|---|---|---|---|---|---|---|---|---|---|
| | Silica | $SrTiO_3$ | First depth | Second depth | Third depth | | | | | | | | | |
| | external additive coating rate (%) | external additive coating rate (%) | position from the outermost surface (nm) | position from the outermost surface (nm) | position from the outermost surface (nm) | First value from the the outermost surface (%) | Second value from the the outermost surface (%) | Third value from the the outermost surface (%) | First value from the the outermost surface (%) | Second value from the the outermost surface (%) | Third value from the the outermost surface (%) | First value from the the outermost surface (%) | Second value from the the outermost surface (%) | Third value from the the outermost surface (%) |
| Toner 1 | 34.0 | 11.1 | 20 | 50 | 300 | 52.3 | 65.0 | 70.3 | 11.0 | 7.0 | 7.0 | 1.4 | 1.5 | 0.8 |
| Toner 2 | 32.1 | 17.6 | 50 | 100 | 360 | 40.7 | 48.0 | 70.3 | 12.0 | 10.0 | 7.0 | 2.5 | 2.4 | 0.8 |
| Toner 3 | 27.1 | 6.9 | 100 | 350 | 480 | 50.7 | 55.0 | 82.7 | 12.0 | 6.0 | 4.0 | 1.2 | 3.2 | 0.5 |
| Toner 4 | 28.0 | 5.2 | 150 | 250 | 420 | 41.3 | 58.0 | 53.3 | 15.0 | 7.0 | 3.0 | 1.1 | 2.4 | 4.7 |
| Toner 5 | 26.1 | 5.2 | 150 | 250 | 420 | 44.7 | 54.7 | 80.0 | 14.0 | 8.0 | 6.0 | 1.1 | 2.4 | No maximum point |
| Toner 6 | 22.0 | 5.0 | 200 | 300 | 650 | 41.7 | 61.0 | 26.3 | 14.5 | 7.0 | 3.0 | 1.3 | 2.0 | 8.2 |
| Toner 7 | 22.0 | 5.0 | 200 | 470 | 700 | 41.7 | 47.0 | 16.0 | 14.5 | 7.0 | 3.0 | 1.3 | 3.8 | 9.5 |
| Toner 8 | 22.6 | 2.4 | 150 | 250 | 420 | 56.0 | 69.0 | 74.3 | 12.0 | 7.0 | 3.0 | 0.5 | 1.0 | 2.0 |
| Toner 9 | 22.8 | 0.0 | 150 | 250 | 420 | 60.0 | 76.7 | 90.0 | 12.0 | 7.0 | 3.0 | No maximum point | No maximum point | No maximum point |
| Toner 10 | 31.0 | 8.7 | 20 | 50 | No minimum point | 58.0 | 76.7 | No minimum point | 10.0 | 4.2 | No maximum point | 1.1 | 1.2 | No maximum point |
| Toner 11 | 20.4 | 8.6 | 100 | 480 | No minimum point | 57.7 | 76.7 | No minimum point | 9.2 | 4.2 | No maximum point | 1.5 | 1.2 | No maximum point |
| Toner 12 | 20.4 | 8.5 | 150 | 300 | No minimum point | 48.7 | 60.3 | No minimum point | 11.2 | 4.2 | No maximum point | 1.8 | 3.3 | No maximum point |
| Toner 13 | 20.5 | 6.7 | 180 | 350 | No minimum point | 45.7 | 60.3 | No minimum point | 12.6 | 4.2 | No maximum point | 1.6 | 3.3 | No maximum point |
| Toner 14 | 21.2 | 6.4 | 120 | 320 | No minimum point | 56.7 | 60.3 | No minimum point | 10.2 | 4.2 | No maximum point | 1.2 | 3.3 | No maximum point |
| Toner 15 | 22.3 | 7.6 | 260 | 400 | No minimum point | 17.7 | 31.7 | No minimum point | 18.9 | 10.0 | No maximum point | 2.5 | 4.5 | No maximum point |
| Toner 16 | 21.3 | 4.8 | 120 | 320 | No minimum point | 59.0 | 69.7 | No minimum point | 10.2 | 4.2 | No maximum point | 0.9 | 2.1 | No maximum point |
| Toner 17 | 21.9 | 0.0 | 120 | 320 | No minimum point | 66.0 | 86.0 | No minimum point | 10.2 | 4.2 | No maximum point | No maximum point | No maximum point | No maximum point |
| Toner 18 | 22.3 | 7.3 | 260 | 400 | No minimum point | 18.3 | 67.3 | No minimum point | 18.9 | No maximum point | No maximum point | 2.4 | 4.2 | No maximum point |

TABLE 2-continued

| | External additive coating rate after water washing | | Depth position where minimum point of concentration of carbon appears | | | Minimum value of concentration of carbon in depth profile by XPS | | | Maximum value of concentration of silicon at minimum point of concentration of carbon in depth profile by XPS | | | Maximum value of concentration of strontium at minimum point of concentration of carbon in depth profile by XPS | | |
|---|---|---|---|---|---|---|---|---|---|---|---|---|---|---|
| | Silica | $SrTiO_3$ | First depth | Second depth | Third depth | | | | | | | | | |
| | external additive coating rate (%) | external additive coating rate (%) | position from the outermost surface (nm) | position from the outermost surface (nm) | position from the outermost surface (nm) | First value from the the outermost surface (%) | Second value from the the outermost surface (%) | Third value from the the outermost surface (%) | First value from the the outermost surface (%) | Second value from the the outermost surface (%) | Third value from the the outermost surface (%) | First value from the the outermost surface (%) | Second value from the the outermost surface (%) | Third value from the the outermost surface (%) |
| Toner 19 | 23.2 | 7.9 | 250 | 350 | No minimum point | 17.7 | 67.3 | No minimum point | 18.9 | No maximum point | No maximum point | 2.5 | 4.2 | No maximum point |
| Toner 20 | 20.4 | 13.3 | 120 | 320 | No minimum point | 46.7 | 1.7 | No minimum point | 10.2 | 29.5 | No maximum point | 2.5 | No maximum point | No maximum point |
| Toner 21 | 20.3 | 13.3 | 250 | 360 | No minimum point | 10.3 | 1.7 | No minimum point | 17.1 | 29.5 | No maximum point | 4.2 | No maximum point | No maximum point |
| Toner 22 | 20.3 | 13.3 | 250 | 360 | No minimum point | 10.3 | 1.7 | No minimum point | 17.1 | 29.5 | No maximum point | 4.2 | No maximum point | No maximum point |
| Toner 23 | 20.6 | 0.0 | 120 | 320 | No minimum point | 68.0 | 91.0 | No minimum point | 9.6 | 2.7 | No maximum point | No maximum point | No maximum point | No maximum point |
| Toner 24 | 11.0 | 13.3 | 250 | 530 | No minimum point | 34.7 | 1.7 | No minimum point | 9.8 | 29.5 | No maximum point | 4.2 | No maximum point | No maximum point |
| Toner 25 | 31.0 | 8.7 | 20 | 510 | No minimum point | 58.0 | 76.7 | No minimum point | 10.0 | 4.2 | No maximum point | 1.1 | 1.2 | No maximum point |
| Toner 26 | 34.0 | 11.1 | 20 | 510 | 650 | 52.3 | 65.0 | 70.3 | 11.0 | 7.0 | 7.0 | 1.4 | 1.5 | 0.8 |
| Toner 27 | 22.8 | 3.3 | 260 | 600 | No minimum point | 28.3 | 61.0 | No minimum point | 18.9 | No maximum point | No maximum point | 1.1 | 5.0 | No maximum point |
| Toner 28 | 35.9 | 3.0 | 90 | 600 | No minimum point | 46.0 | 53.3 | No minimum point | 15.0 | No maximum point | No maximum point | 0.5 | 6.0 | No maximum point |
| Toner 29 | 28.3 | 2.4 | 150 | No minimum point | No minimum point | 46.0 | No minimum point | No minimum point | 15.0 | No maximum point | No maximum point | 0.5 | No maximum point | No maximum point |
| Toner 30 | 47.5 | 4.0 | 20 | No minimum point | No minimum point | 46.0 | No minimum point | No minimum point | 15.0 | No maximum point | No maximum point | 0.5 | No maximum point | No maximum point |
| Toner 31 | 42.2 | 3.5 | 50 | No minimum point | No minimum point | 46.0 | No minimum point | No minimum point | 15.0 | No maximum point | No maximum point | 0.5 | No maximum point | No maximum point |

Production Example of Magnetic Core Particles

Step 1 (Weighing and Mixing Step)

$FezO_3$: 62.7 parts
$MnCO_3$: 29.5 parts
$Mg(OH)_2$: 6.8 parts
$SrCO_3$: 1.0 part The above materials were weighed so that the materials had the above composition ratios. Thereafter, the materials were pulverized and mixed with a dry vibration mill using stainless steel beads having a diameter of ⅛ inches for 5 hours.

Step 2 (Pre-Sintering Step)

The obtained pulverized product was prepared as pellets having a size of about 1 mm square using a roller compactor. A coarse powder was removed from the pellets with a vibration sieve with a mesh opening of 3 mm, a fine power was removed with a vibration sieve with a mesh opening of 0.5 mm, and the pellets were fired at 1,000° C. under a nitrogen atmosphere (oxygen concentration: 0.01 vol %) using a burner type firing furnace for 4 hours, thereby preparing pre-sintered ferrite. The composition of the obtained pre-sintered ferrite is as shown in the following Formula (3).

Formula (3)

$$(MnO)_a(MgO)_b(SrO)_c(Fe_2O_3)_d$$

In the above formula, a is 0.257, b is 0.117, c is 0.007, and dis 0.393.

Step 3 (Pulverization Step)

The obtained pre-sintered ferrite was pulverized to about 0.3 mm with a crusher, 30 parts of water were added to 100 parts of the pre-sintered ferrite using zirconia beads having a diameter of ⅛ inches, and pulverization was performed with a wet ball mill for 1 hour. The obtained slurry was pulverized with a wet ball mill using alumina beads having a diameter of 1/16 inches for 4 hours to obtain a ferrite slurry (a finely pulverized product of pre-sintered ferrite).

Step 4 (Granulation Step)

To the ferrite slurry, ammonium polycarboxylate as a dispersant and polyvinyl alcohol as a binder were added in amounts of 1.0 part and 2.0 parts, respectively, with respect to 100 parts of the pre-sintered ferrite, and the mixture was granulated into spherical particles using a spray dryer (manufactured by Ohkawara Kakohki Co., Ltd.). After adjusting the particle size of the obtained particles, the particles were heated at 650° C. using a rotary kiln for 2 hours to remove organic components such as the dispersant and the binder.

Step 5 (Sintering Step)

In order to control the sintering atmosphere, the temperature was raised from room temperature to 1,300° ° C. under a nitrogen atmosphere (oxygen concentration: 1.00 vol %) in an electric furnace for 2 hours, and then sintering was performed at 1,150° C. for 4 hours. Thereafter, the temperature was lowered to 60° C. over 4 hours, the atmosphere was returned from the nitrogen atmosphere, and the particles were taken out at 40° C. or lower.

Step 6 (Sorting Step)

After pulverizing the aggregated particles, a low-magnetic force product was discarded by magnetic separation, and coarse particles were removed by sieving with a sieve having a mesh opening of 250 μm, thereby obtaining magnetic core particles having a 50% particle size (D50) of 37.0 μm based on a volume distribution.

<Preparation of Coating Resin>

Cyclohexyl methacrylate monomer: 26.8 parts by mass
Methyl methacrylate monomer: 0.2 parts by mass
Methyl methacrylate macromonomer: 8.4 parts by mass
(Macromonomer Having Methacryloyl Group at One Terminal and Having Weight Average Molecular Weight of 5,000)
Toluene: 31.3 parts by mass
Methyl ethyl ketone: 31.3 parts by mass
Azobis(isobutyronitrile): 2.0 parts by mass Among the above materials, the cyclohexyl methacrylate monomer, the methyl methacrylate monomer, the methyl methacrylate macromonomer, the toluene, and the methyl ethyl ketone were charged into a four-necked separable flask equipped with a reflux condenser, a thermometer, a nitrogen introduction tube, and a stirring apparatus. Thereafter, a nitrogen gas was introduced to make a sufficient nitrogen atmosphere. Thereafter, the temperature was raised to 80° C., azobis(isobutyronitrile) was added, and the mixture was refluxed and polymerized for 5 hours. Hexane was injected into the obtained reaction product, the copolymer was precipitated, the precipitate was filtered, and then the precipitate was subjected to vacuum dry, thereby obtaining a coating resin 1.

Next, 30 parts of the coating resin 1 were dissolved in 40 parts of toluene and 30 parts of methyl ethyl ketone to obtain a polymer solution (solid content: 30% by mass).

<Preparation of Coating Resin Solution>

Polymer solution (resin solid content concentration: 30%): 33.3 parts by mass
Toluene: 66.4 parts by mass
Carbon black Regal 330 (manufactured by Cabot Corporation): 0.3 parts by mass
(Primary particle size: 25 nm, nitrogen adsorption specific surface area: 94 $m^2/g$, DBP oil absorption amount: 75 mL/100 g)

The above materials were dispersed by a paint shaker using zirconia beads having a diameter of 0.5 mm for 1 hour. The obtained dispersion liquid was filtered by a 5.0 μm membrane filter to obtain a coating resin solution.

Production Example of Magnetic Carrier (Resin Coating Step)

The magnetic core particles and the coating resin solution were charged into a vacuum degassed kneader maintained at room temperature. The charging amount of coating resin solution as a resin component was set to 2.5 parts with respect to 100 parts of the magnetic core particles. After the charging, the mixture was stirred at a rotation speed of 30 rpm for 15 minutes, the solvent was volatilized to a predetermined level (80% by mass) or more, the temperature was raised to 80° C. while performing mixing under reduced pressure, toluene was distilled over 2 hours, and then the mixture was cooled. The low magnetic force product was separated from the obtained magnetic carrier by magnetic separation, and the separated product was passed through a sieve having an opening of 70 μm and classified with a wind power classifier, thereby obtaining a magnetic carrier having a 50% particle size (D50) of 38.2 μm based on a volume distribution.

Production Example of Developer 1

92.0 parts of the magnetic carrier and 8.0 parts of the toner 1 were mixed by a V-type mixer (V-20, manufactured by Seishin Enterprise Co., Ltd.) to obtain a developer 1.

Production Examples of Developers 2 to 31

Developers 2 to 31 were obtained by performing the same operation as in Production Example of the developer 1 except that the toners were changed as shown in Table 3.

TABLE 3

| | Mixed toner |
|---|---|
| Developer 1 | Toner 1 |
| Developer 2 | Toner 2 |
| Developer 3 | Toner 3 |
| Developer 4 | Toner 4 |
| Developer 5 | Toner 5 |
| Developer 6 | Toner 6 |
| Developer 7 | Toner 7 |
| Developer 8 | Toner 8 |
| Developer 9 | Toner 9 |
| Developer 10 | Toner 10 |
| Developer 11 | Toner 11 |
| Developer 12 | Toner 12 |
| Developer 13 | Toner 13 |
| Developer 14 | Toner 14 |
| Developer 15 | Toner 15 |
| Developer 16 | Toner 16 |
| Developer 17 | Toner 17 |
| Developer 18 | Toner 18 |
| Developer 19 | Toner 19 |
| Developer 20 | Toner 20 |
| Developer 21 | Toner 21 |
| Developer 22 | Toner 22 |
| Developer 23 | Toner 23 |
| Developer 24 | Toner 24 |
| Developer 25 | Toner 25 |
| Developer 26 | Toner 26 |
| Developer 27 | Toner 27 |
| Developer 28 | Toner 28 |
| Developer 29 | Toner 29 |
| Developer 30 | Toner 30 |
| Developer 31 | Toner 31 |

Example 1

The following evaluation was performed using a full-color copying machine imagePRESS C800 or a modified machine thereof as an image forming apparatus. The evaluation results are shown in Table 4. The image forming apparatus has a photoreceptor that forms an electrostatic latent image as an image bearing member, and has a developing step in which the electrostatic latent image of the photoreceptor is developed as a toner image by a two-component developer. The image forming apparatus further includes a transfer step of transferring the developed toner image onto an intermediate transfer body and then transferring the toner image of the intermediate transfer body onto a paper, and a fixing step of fixing the toner image on the paper by heat. The developer 1 was charged into a developing device of a cyan station of the image forming apparatus, and the following evaluation was performed.

[Transfer Efficiency After Long-Term Output]

The transfer efficiency is an index of transferability showing a percentage of the toner transferred onto an intermediate transfer belt in the toner developed on the photosensitive drum. The transfer efficiency was measured by the following procedure.

First, 3,000 sheets of solid images were output using a modified machine of an imagePRESS C800 as an image forming apparatus. Thereafter, an image forming process was performed until the toner was transferred onto the intermediate transfer belt, and the toner remaining on the photosensitive drum even after the transfer of the toner transferred onto the intermediate transfer belt was peeled off with a transparent polyester adhesive tape. A density difference was calculated by subtracting a density of the toner when only the adhesive tape was stuck on the paper from a density of the toner when the stripped adhesive tape was stuck on the paper. When the sum of the toner density differences is 100, the transfer efficiency is a ratio of the toner density on the intermediate transfer belt, and the higher the ratio is, the better the transfer efficiency is.

The measurement was performed under a high temperature and high humidity environment (30° C./relative humidity of 80%), 3,000 sheets of the images were output, and the transfer efficiency was determined according to the following evaluation criteria.

The toner density was measured with a "504 spectral densitometer" (manufactured by X-Rite Inc.).

(Evaluation Criteria)

A: The transfer efficiency is 99% or more (excellent)

B: The transfer efficiency is 97% or more and less than 99% (slightly excellent)

C: The transfer efficiency is 95% or more and less than 97% (level of the related art)

D: The transfer efficiency is less than 95% (inferior to the related art)

In the evaluation criteria, A to C were regarded as acceptable levels in the present invention, and D was regarded as an unacceptable level in the present invention.

<Evaluation of Occurrence of Ghost>

The occurrence of ghost was evaluated as follows.

Figure 2:
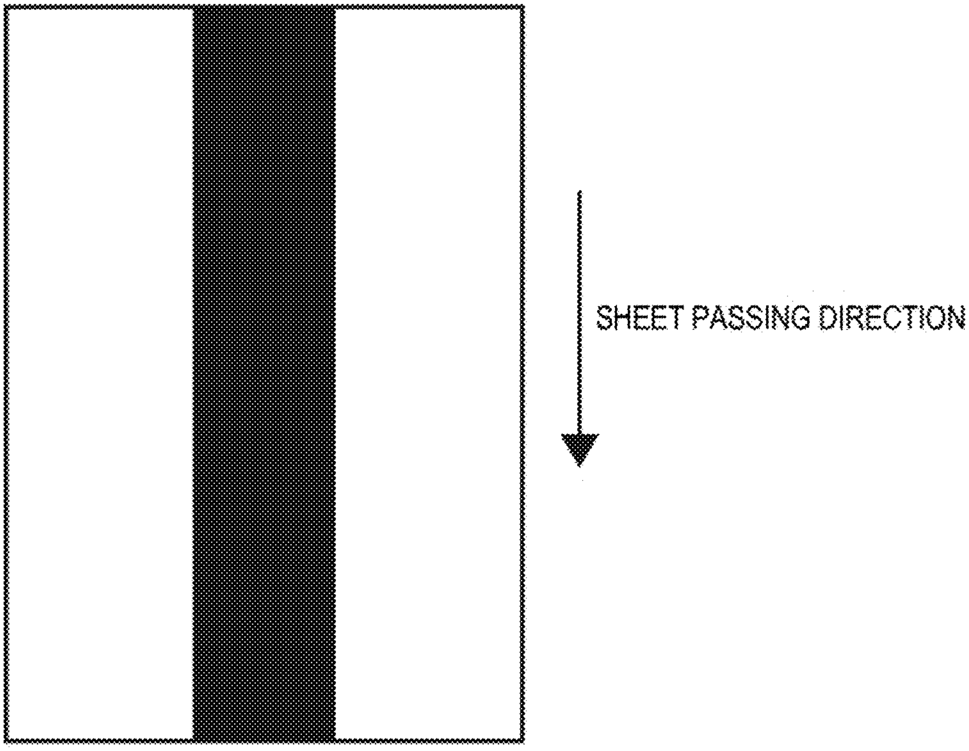
FIG. 2 is an explanatory view of a test chart used for evaluation of occurrence of ghost.
Figure 3:
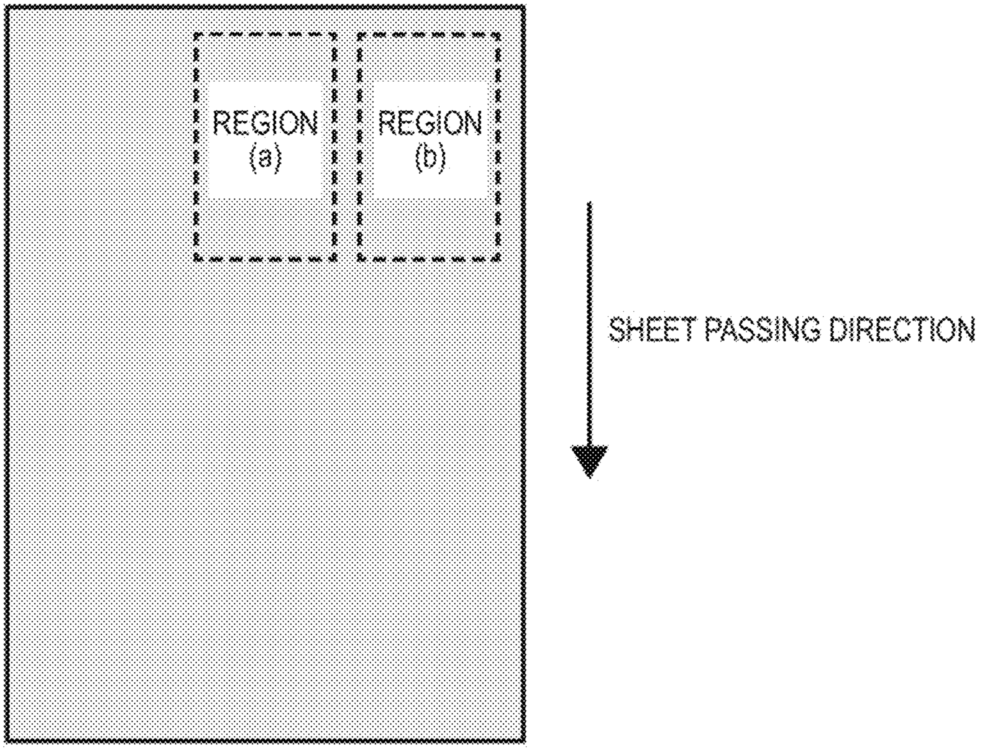
FIG. 3 is an explanatory view of a method for evaluating occurrence of ghost.
Figure 4:
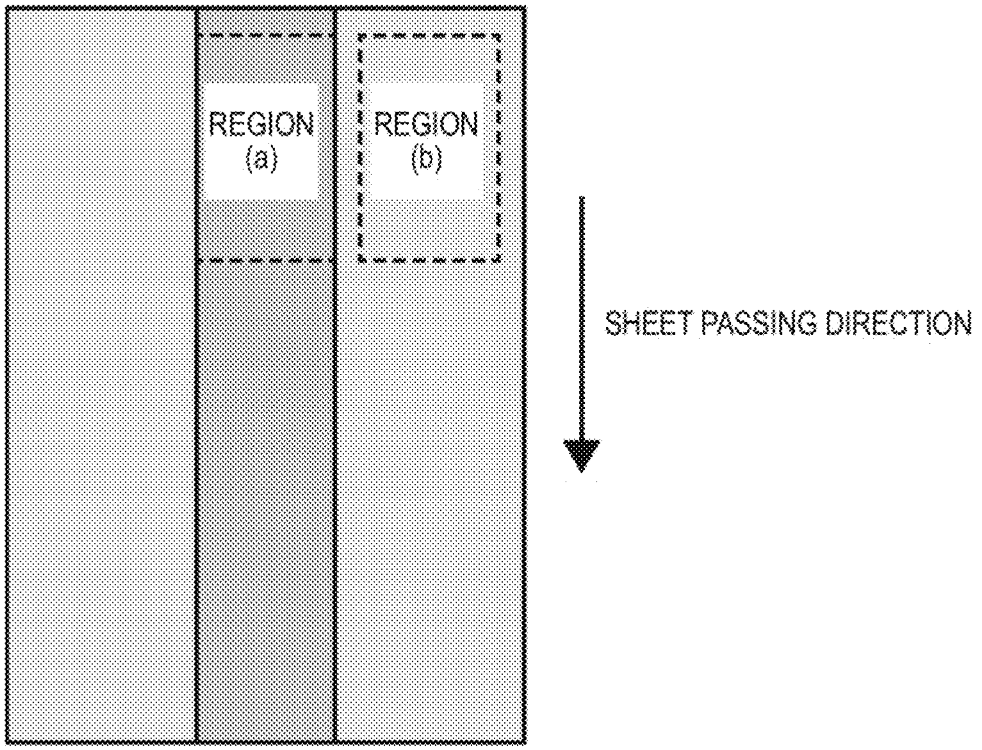
FIG. 4 is an explanatory view of ghost.

A modified machine of an imagePRESS C800 was used as an image forming apparatus. The modification point is that a mechanism for discharging an excessive magnetic carrier inside the developing device from the developing device is removed. The image forming apparatus was adjusted so that the toner amount applied on the paper in an FFH image (solid image) was 0.45 mg/cm$^2$. FFH is a value indicating 256 gradations by a hexadecimal number, 00H is the first gradation of 256 gradations (white background portion), and FFH is the 256$^{th}$ gradation of 256 gradations (solid portion). Then, 999 sheets of papers were continuously passed through a test chart with a solid black vertical band and solid white portions except for the vertical band as illustrated in FIG. 2, and then the 1000$^{th}$ sheet was printed with a full-surface halftone image in the same job. The sheet passing direction is illustrated in FIG. 2. On the halftone image, image densities of a region (a) in which the sheet was passed through the solid black vertical band and a region (b) in which the sheet was passed through the solid white portion in FIG. 3 were measured, and occurrence of ghost was evaluated by a difference in density. FIG. 4 illustrates a case where ghost occurs.

The image density was measured using an X-Rite color reflection densitometer (manufactured by X-Rite Inc., X-rite 500 Series). The measurement was performed under a normal temperature and normal humidity (NN) environment (temperature: 23° C., relative humidity: 50% or more and 60% or less), a normal temperature and low humidity (NL) environment (temperature: 23° C., relative humidity: 5%), and a high temperature and high humidity (HH) environment (temperature: 30° C., relative humidity: 80%). Among them, a value having the highest density difference was defined as a density difference, and was determined according to the following evaluation criteria.

(Evaluation Criteria: Ghost)

A: The density difference between the region (a) and the region (b) is less than 0.02 (excellent)

B: The density difference between the region (a) and the region (b) is 0.02 or more and less than 0.04 (slightly excellent)

C: The density difference between the region (a) and the region (b) is 0.04 or more and less than 0.06 (level of the related art)

D: The density difference between the region (a) and the region (b) is 0.06 or more (inferior to the related art)

In the evaluation criteria, A to C were regarded as acceptable levels in the present invention, and D was regarded as an unacceptable level in the present invention.

<Low-Temperature Fixability (Fixable Lower Limit Temperature)>

A developing device to which a two-component developer 1 was added was mounted on a cyan station of an imagePRESS C800, and the device was modified so that an image was formed in a state where a fixing device was removed. An unfixed toner image (hereinafter, referred to as an unfixed image) was formed on the evaluation paper using the device. A plain paper (trade name: GF-C157, manufactured by Canon Marketing Japan Inc., A4, 157 g/$cm^2$) for a color copying machine and printer was used as the evaluation paper. The developing conditions were appropriately adjusted so that the toner amount applied of the FFH image (hereinafter, referred to as a "solid portion") on the paper was 1.2 mg/$cm^2$ to form an unfixed image of 2 cm×10 cm at the central position of the evaluation paper with 3 cm from the leading end of the A4 vertical evaluation paper. The unfixed image was humidified under a low temperature and low humidity environment (15° C./10% Rh) for 24 hours.

Subsequently, the fixing device of the full-color copying machine imagePRESS C800 manufactured by Canon Inc. and the fixing test jig capable of independently controlling the process speed and the upper and lower fixing member temperatures were replaced. The fixability evaluation was performed under a low temperature and low humidity environment (15° C./10% Rh), and the process speed was adjusted to 400 mm/sec. In the actual evaluation, the sheet on which the unfixed image was formed was passed while the temperature of the belt that was the temperature of the fixing member on the upper side of the fixing test jig was adjusted to every 5° C. in the range of 100° C. to 200° C., and during that time, the evaluation was performed in a state where the temperature of the belt that was the temperature of the fixing member on the lower side was fixed to 100° C. The fixed image passed through the fixing device was rubbed back and forth 5 times with a lens cleaning wiper (Dusper, manufactured by Ozu Corporation) while applying a load of 4.9 kPa, and the fixing temperature was set so that a decrease rate of the image density after the rubbing was 10% or less. It was determined that the toner image was not fixed when the decrease rate of the image density was more than 10%. The lowest set temperature of the upper belt at which the decrease rate of the image density was not more than 10% was taken as a low-temperature fixing temperature, and determination was performed according to the following evaluation criteria.

(Evaluation Criteria: Low-Temperature Fixability)

A: Lower than 130° C. (excellent) B: 130° C. or higher and lower than 150° C. (slightly excellent)

C: 150° C. or higher and lower than 160° C. (level of the related art)

D: 160° C. or higher (inferior to the related art)

In the evaluation criteria, A to C were regarded as acceptable levels in the present invention, and D was regarded as an unacceptable level in the present invention.

TABLE 4

| | | Evaluation of transferability after long-term use | | Evaluation of ghost | | Evaluation of low-temperature fixability | |
|---|---|---|---|---|---|---|---|
| Example/Comparative Example | Developer | Transfer efficiency after long-term output (%) | Evaluation rank | Density difference | Evaluation rank | Fixable lower limit temperature (° C.) | Evaluation rank |
| Example 1 | Developer 1 | 99.31 | A | 0.009 | A | 125.09 | A |
| Example 2 | Developer 2 | 99.10 | A | 0.009 | A | 149.08 | B |
| Example 3 | Developer 3 | 98.44 | B | 0.004 | A | 130.69 | B |
| Example 4 | Developer 4 | 98.40 | B | 0.001 | A | 134.71 | B |
| Example 5 | Developer 5 | 98.38 | B | 0.015 | A | 148.94 | B |
| Example 6 | Developer 6 | 98.13 | B | 0.005 | A | 143.34 | B |
| Example 7 | Developer 7 | 96.83 | C | 0.010 | A | 147.22 | B |
| Example 8 | Developer 8 | 97.69 | B | 0.007 | A | 127.96 | A |
| Example 9 | Developer 9 | 97.15 | B | 0.008 | A | 123.94 | A |
| Example 10 | Developer 10 | 98.72 | B | 0.009 | A | 120.20 | A |
| Example 11 | Developer 11 | 97.34 | B | 0.020 | B | 125.09 | A |
| Example 12 | Developer 12 | 98.92 | B | 0.003 | A | 148.51 | B |
| Example 13 | Developer 13 | 98.31 | B | 0.001 | A | 129.68 | A |
| Example 14 | Developer 14 | 98.36 | B | 0.002 | A | 148.94 | B |
| Example 15 | Developer 15 | 98.35 | B | 0.017 | A | 135.29 | B |
| Example 16 | Developer 16 | 97.99 | B | 0.013 | A | 146.07 | B |
| Example 17 | Developer 17 | 96.89 | C | 0.011 | A | 145.20 | B |
| Example 18 | Developer 18 | 98.27 | B | 0.015 | A | 132.85 | B |
| Example 19 | Developer 19 | 98.63 | B | 0.008 | A | 132.56 | B |
| Example 20 | Developer 20 | 99.96 | A | 0.017 | A | 131.70 | B |
| Example 21 | Developer 21 | 99.81 | A | 0.017 | A | 135.86 | B |
| Example 22 | Developer 22 | 99.81 | A | 0.003 | A | 135.86 | B |

TABLE 4-continued

| Example/Comparative Example | Developer | Evaluation of transferability after long-term use: Transfer efficiency after long-term output (%) | Evaluation of transferability after long-term use: Evaluation rank | Evaluation of ghost: Density difference | Evaluation of ghost: Evaluation rank | Evaluation of low-temperature fixability: Fixable lower limit temperature (° C.) | Evaluation of low-temperature fixability: Evaluation rank |
|---|---|---|---|---|---|---|---|
| Example 23 | Developer 23 | 96.87 | C | 0.013 | A | 144.77 | B |
| Comparative Example 1 | Developer 24 | 93.94 | D | 0.053 | C | 137.01 | B |
| Comparative Example 2 | Developer 25 | 94.27 | D | 0.034 | B | 143.62 | B |
| Comparative Example 3 | Developer 26 | 94.86 | D | 0.031 | B | 149.08 | B |
| Comparative Example 4 | Developer 27 | 88.54 | D | 0.089 | D | 159.00 | C |
| Comparative Example 5 | Developer 28 | 88.61 | D | 0.093 | D | 156.13 | C |
| Comparative Example 6 | Developer 29 | 87.12 | D | 0.085 | D | 143.34 | B |
| Comparative Example 7 | Developer 30 | 87.12 | D | 0.087 | D | 143.62 | B |
| Comparative Example 8 | Developer 31 | 87.00 | D | 0.087 | D | 143.77 | B |

It was shown from the above results that in the depth region from the outermost surface to the depth of 500 nm of each of the particles of the toner, when the distribution of the composition in the depth direction was measured by X-ray photoelectron spectroscopy, two or more minimum points of the concentration of the carbon element contained in the depth region existed. Furthermore, it was shown that in the depth position corresponding to each of the minimum points of the concentration of the carbon element, the inorganic element having the maximum value of the concentration was present, and when the inorganic element in the toner is an element derived from the inorganic fine particle, deterioration of the transferability was suppressed even after long-term use, and the occurrence of ghost was suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a Continuation of U.S. patent application Ser. No. 17/383,033 filed Jul. 22, 2021 which claims the benefit of Japanese Patent Application No. 2020-137049, filed Aug. 14, 2020, the contents of both of which are hereby incorporated by reference herein in their entirety.

What is claimed is:

1. A method for producing a toner, comprising the steps of:

obtaining a first mixture by mixing a toner particle and a first inorganic fine particle;

a first heat treatment step of obtaining a first treated particle by performing a heat treatment with hot air to the first mixture, the first treated particle being the toner particle to which the first inorganic fine particle is fixed;

obtaining a second mixture by mixing the first treated particle and a second inorganic fine particle; and a second heat treatment step of obtaining a second treated particle by performing a heat treatment with hot air to the second mixture, the second treated particle being the first treated particle to which the second inorganic fine particle is fixed, wherein the toner comprises a toner particle containing a binder resin, a colorant, and an inorganic fine particle containing the first inorganic fine particle and the second inorganic fine particle, and in a depth profile of an element distribution obtained by element analysis in a depth region from the outermost surface of the toner particle to a depth of 500 nm performed by X-ray photoelectron spectroscopy (i) two or more minimum points of a concentration of a carbon element exist in the depth region, (ii) a concentration of an inorganic element derived from the inorganic fine particle becomes a maximum value at a depth position corresponding to each of the minimum points, and (iii) the inorganic fine particle exists within the depth region so as to exhibit each of the maximum values of the inorganic element.

2. The method according to claim 1, wherein the first inorganic fine particle contains a silica fine particle and a strontium titanate fine particle.

3. The method according to claim 1, wherein the second inorganic fine particle contains a silica fine particle and a strontium titanate fine particle.

* * * * *